United States Patent [19]

Katori et al.

[11] Patent Number: 5,694,223
[45] Date of Patent: Dec. 2, 1997

[54] DIGITAL IMAGE FORMING APPARATUS WHICH SPECIFIES A SENSITIVITY CHARACTERISTIC OF A PHOTOCONDUCTOR

[75] Inventors: Kentaro Katori, Toyokawa; Toshifumi Watanabe, Toyohashi; Yukihiko Okuno, Toyokawa; Masaki Tanaka, Toyohashi; Hironobu Nakata; Katsuyuki Hirata, both of Toyokawa, all of Japan

[73] Assignee: Minolta Co., Ltd., Osaka, Japan

[21] Appl. No.: 611,718

[22] Filed: Mar. 6, 1996

[30] Foreign Application Priority Data

| Mar. 7, 1995 | [JP] | Japan | 7-046995 |
| Mar. 7, 1995 | [JP] | Japan | 7-046996 |
| Mar. 7, 1995 | [JP] | Japan | 7-047107 |
| Mar. 7, 1995 | [JP] | Japan | 7-047108 |

[51] Int. Cl.⁶ ............... H04N 1/00; H04N 1/46; G03F 3/08; G03G 21/00
[52] U.S. Cl. ............... 358/300; 358/406; 358/504; 358/519; 399/49; 399/74
[58] Field of Search ............... 358/296, 298, 358/300, 401, 406, 448, 504, 519; 399/46, 48, 49, 72–74; 347/112, 115, 133

[56] References Cited

U.S. PATENT DOCUMENTS

| 5,148,289 | 9/1992 | Nishiyama et al. | 358/300 |
| 5,189,441 | 2/1993 | Fukui et al. | 346/160 |
| 5,206,686 | 4/1993 | Fukui et al. | 355/208 |
| 5,212,560 | 5/1993 | Hattori et al. | 358/360 |
| 5,241,347 | 8/1993 | Kodama | 399/49 |
| 5,250,959 | 10/1993 | Yamada et al. | 346/108 |
| 5,266,997 | 11/1993 | Nakane et al. | 399/49 |
| 5,305,057 | 4/1994 | Hattori et al. | 355/203 |
| 5,311,215 | 5/1994 | Hattori et al. | 346/160 |
| 5,315,351 | 5/1994 | Matsushiro et al. | 399/49 |
| 5,583,644 | 12/1996 | Sasanuma et al. | 358/296 |
| 5,585,927 | 12/1996 | Fukui et al. | 358/298 |

FOREIGN PATENT DOCUMENTS

| 58-107555 | 6/1983 | Japan | G03G 15/01 |

*Primary Examiner*—Eric Frahm
*Attorney, Agent, or Firm*—Sidley & Austin

[57] ABSTRACT

A printer control unit carries out a predetermined calculation based on the amount of adhering toner detected by an AIDC sensor and the surface potential of a photoconductor detected by a V sensor to correct the light emission intensity of a light source to prepare light emission characteristic data for γ correction to obtain an optimal image. A γ correcting unit corrects an image signal output from an image signal processing unit using the calculated light emission characteristic data for γ correction to control the light source to emit light based on the corrected data. More specifically, since the γ correction data is obtained by calculation, optimal γ correction can always be carried out without a memory of a large capacity.

39 Claims, 30 Drawing Sheets

AMOUNT OF TONER ADHERING
ONTO PHOTOCONDUCTOR (mg/cm$^2$)

AMOUNT OF TONER ADHERING
ONTO PHOTOCONDUCTOR (mg/cm$^2$)

| EXPOSURE STEP (STP) | EXPOSURE LEVEL |
|---|---|
| 1 | 32 |
| 2 | 48 |
| 3 | 64 |
| 4 | 80 |
| 5 | 96 |
| 6 | 112 |
| 7 | 128 |
| 8 | 144 |
| 9 | 160 |
| 10 | 192 |
| 11 | 224 |
| 12 | 255 |

FIG. 30

| AMOUNT OF TONER TRANSFERRED | AMOUNT OF RESIDUAL TONER ON PC (R) (mg/cm²) |
|---|---|
| 0 | 0 |
| $\frac{1.0}{255} \times 1$ | 0.003 |
| $\frac{1.0}{255} \times 2$ | 0.006 |
| ⋮ | ⋮ |
| $\frac{1.0}{255} \times 128$ | 0.08 |
| ⋮ | ⋮ |
| $\frac{1.0}{255} \times 255$ | 0.1 |

FIG. 31

| ABSOLUTE HUMIDITY | COEFFICIENT ($d_1$) |
|---|---|
| ~10 | 1.05 |
| ~15 | 1.02 |
| ~20 | 1.0 |
| ~25 | 0.98 |
| 25~ | 0.95 |

FIG. 32

| KIND OF PAPER | COEFFICIENT ($d_2$) |
|---|---|
| THICK PAPER | 1.05 |
| STANDARD | 1.0 |
| THIN PAPER | 0.95 |

FIG. 33

| NUMBER OF COPIES TO BE MADE BY MACHINE | COEFFICIENT ($d_3$) |
|---|---|
| ~10$^K$ | 1.0 |
| ~20$^K$ | 0.95 |
| ~30$^K$ | 0.90 |

DIGITAL IMAGE FORMING APPARATUS WHICH SPECIFIES A SENSITIVITY CHARACTERISTIC OF A PHOTOCONDUCTOR

BACKGROUND OF THE INVENTION

1. Field of the Invention

The present invention relates to digital image forming apparatuses, and more particularly, to a digital image forming apparatus for forming a predetermined image on a transfer material using an image forming parameter.

2. Description of the Related Art

Various kinds of image forming apparatuses have come in practice such as a laser printer and a digital copying machine driving a light source based on image data converted into a digital value to form an image. A variety of digital image forming apparatuses for reproducing a so-called half tone image such as a photograph with high fidelity have been proposed.

An area gradation method using a dither matrix, a multi-level laser exposure method representing gradation for one printed dot by changing the quantity of laser light by changing the pulse width or the light emission intensity of the laser and the like are known as a method employed in a digital image forming apparatus of this kind. Further, a digital image forming apparatus is also known using a multi-level dither method which combines dither and a pulse width modulation system or an intensity modulation system.

According to this kind of gradation method, image density having gradation which is in one-to-one correspondence with gradient of image data to be reproduced should be reproduced in principle. However, original density to be reproduced is not accurately proportional to density of the reproduced image due to complication of various factors such as photosensitive characteristics of a photoconductor, toner characteristics, and usage environment. This non-proportional characteristic is generally called a γ characteristic. FIG. 47 shows the γ characteristic schematically. As shown in FIG. 47, the γ characteristic (B in the figure) is shifted from a proportional characteristic A which should be obtained originally. This γ characteristic is a principal factor causing fidelity of a reproduced image with respect to a half tone image in particular to decrease.

Therefore, in order to improve the fidelity of the reproduced image, read original density is converted using a conversion table storing predetermined light emission data for γ correction and a digital image is formed based on the converted original density, so that the original density and the image density satisfy a linear relationship (characteristic A in FIG. 47). This is so-called γ correction. As a result, by carrying out γ correction, an image can generally be reproduced with high fidelity according to the original density.

As a first conventional example of a digital image forming apparatus carrying out the above described γ correction, proposed is a digital image forming apparatus which compensates for gradation variation by changing at least one of a photoconductor surface potential before exposure by an exposing device and a development bias potential applied in advance to a developing device to control the density as well as by selecting a predetermined conversion table among a plurality of conversion tables for γ correction prestoring light emission data for γ correction according to gradation variation with change in the photoconductor surface potential and the development bias potential to control the quantity of light of the exposing device non-linearly.

A second conventional example of a digital image forming apparatus carrying out the above described γ correction is a color copying machine disclosed in Japanese Patent Laying-Open No. 58-107555, for example. In this conventional digital image forming apparatus, the surface potential of a photoconductor is measured by a surface potential sensor fixed at a position a predetermined distance from a developing device for the γ correction. More specifically, in order to carry out the γ correction, the surface potential of the photoconductor is measured after a predetermined time, the potential change is stored, the potential change at a position of each developing device is corrected based on the stored value, and an image forming parameter is determined based on the corrected potential.

However, the above described first and second conventional examples have the following problems (1) to (4).

(1) In the digital image forming apparatus of the first conventional example, a predetermined number of prepared conversion tables for γ correction are used for the γ correction. Therefore, a delicate correction according to environmental change and the like cannot be carried out, and the optimal γ correction cannot be necessarily carried out.

When a plurality of factors causing the γ curve to shift change, conversion tables for γ correction corresponding to a large number of combination patterns must be stored, requiring a memory of a large capacity for storing the conversion tables. In a fixed type full color copying machine, the combination patterns are further complicated as compared with a monochrome copying machine and an elevator system full color copying machine, because an image is developed at different positions for respective colors. The elevator system full color copying machine includes a developing unit housing developing devices for respective colors arranged up and down. By moving the developing unit up and down so that any one of the developing devices is selectively opposed to a photoconductor, an image is developed. Therefore, any color image is developed at the same position. The fixed type full color copying machine includes developing devices for respective colors sequentially arranged opposing to a photoconductor therearound. By selectively operating the developing device, an image is formed with each color. Therefore, respective color images are developed at different positions.

The memory of a large capacity for storing the conversion tables for γ correction corresponding to a large number of combination patterns increases not only the cost of the apparatus but also the number of experimental steps, because the respective combination patterns must be tested and conversion tables for γ correction corresponding to the combination patterns must be prepared. This hampers efficient development of this kind of apparatus.

(2) In the digital image forming apparatus of the second conventional example, change in the surface potential of the photoconductor after a predetermined time is prestored, and based on the stored value, the surface potential at the position of each developing device is determined. Therefore, an image forming parameter is determined only with a uniquely determined value. This hampers an appropriate γ correction. More specifically, since change in the surface potential caused simply by lapse of time is detected, change in environmental conditions and the like, if it occurs thereafter, is not considered. An image forming parameter according to the environmental conditions cannot be determined.

(3) Since the digital image forming apparatus of the first conventional example does not consider change in development start potential, it cannot set an optimal image forming parameter for the γ correction. Therefore, in order to carry out the optimal γ correction, the serviceman must switch grid potential Vg of a corona charger and development bias potential Vb of each developing device manually to set optimal grid potential Vg and development bias potential Vb in a cut and try manner. This complicates maintenance of the apparatus.

(4) Since the digital image forming apparatus of the first conventional example does not consider a toner transfer efficiency from the photoconductor to a transfer material changed by the environmental conditions of the photoconductor and the like, the optimal γ correction cannot be carried out with data for γ correction prestored in the conversion tables for γ correction, if the environment changes.

SUMMARY OF THE INVENTION

One object of the present invention is to provide a digital image forming apparatus which can always carry out an optimal γ correction without a memory of a large capacity.

Another object of the present invention is to provide a digital image forming apparatus which can decide an image forming parameter with which an optimal image is always obtained.

Still another object of the present invention is to provide a digital image forming apparatus which can decide an image forming parameter in consideration of change in development start potential to form an optimal image by deciding the development start potential automatically in the apparatus.

A further object of the present invention is to provide a digital image forming apparatus which can decide optimal data for γ correction and an optimal image forming parameter in consideration of a transfer efficiency to obtain a desired gradation characteristic.

According to one aspect of the present invention, an image forming apparatus for converting image data into light emission data, indicating the quantity of light emission based on γ correction data, to form an image based on the light emission data includes: an image forming unit for forming an image and including a photoconductor, a charging unit for charging the photoconductor, an exposing unit for exposing the photoconductor, charged by the charging unit, to light modulated by the light emission data to form an electrostatic latent image on the photoconductor, and a developing unit for developing, with a developer material, the electrostatic latent image on the photoconductor formed by the exposing unit; a detecting unit detecting the amount of the developer material adhering to the image on the photoconductor developed by the developing unit; a first specifying unit for specifying the sensitivity characteristic of the photoconductor; a second specifying unit for specifying the development characteristic of the developing unit based on the sensitivity characteristic specified by the first specifying unit and the amount of adhering developer material detected by the detecting unit for; a deciding unit deciding an optimal operating condition of the image forming unit based on the development characteristic of the developing unit specified by the second specifying unit for; and a calculating unit calculating γ correction data for obtaining a desired gradation characteristic under the operating condition decided by the deciding unit.

Since the digital image forming apparatus calculates data for γ correction for obtaining the desired gradation characteristic, optimal γ correction can always be carried out without a memory of a large capacity.

According to another aspect of the present invention, an image forming apparatus for forming an image under a set image forming condition includes: an image forming unit for forming an image and including a mobile photoconductor, a charging unit for charging the photoconductor, an exposing unit for exposing the photoconductor charged by the charging unit to light modulated by light emission data to form an electrostatic latent image on the photoconductor, and a developing unit for developing, with a developer material, the electrostatic latent image on the photoconductor formed by said exposing unit; a detecting unit for detecting the potential of the photoconductor at a detection position; a first specifying unit for specifying the sensitivity characteristic of the photoconductor at the detection position based on the potential of the photoconductor detected by the detecting unit for; a second specifying unit specifying the sensitivity characteristic of the photoconductor at a development position of the developing unit based on the sensitivity characteristic of the photoconductor specified by the first specifying unit; and a setting unit for deciding and setting an image forming condition based on the sensitivity characteristic specified by the second specifying unit.

Since the digital image forming apparatus can predict the sensitivity characteristic of the photoconductor at the position of the developing unit to decide the image forming condition according to the predicted sensitivity characteristic, a favorable image can always be formed under an optimal image forming condition.

According to still another aspect of the present invention, an image forming apparatus for forming an image under a set image forming condition includes: an image forming unit for forming an image and including a photoconductor, a charging unit for charging the photoconductor, an exposing unit for exposing the photoconductor charged by the charging unit to light modulated by light emission data to form an electrostatic latent image on the photoconductor, and a for developing, with a developer material, unit developing the electrostatic latent image on the photoconductor formed by the exposing unit; material; a detecting unit for detecting the amount of the developer material adhering to the image on the photoconductor developed by the developing unit; a specifying unit for specifying the sensitivity characteristic of the photoconductor; a deciding unit for controlling the image forming unit to form a test image, for controlling the detecting unit to detect the amount of the developer material adhering to the test image, and for calculating the surface potential of the test image based on the sensitivity characteristic specified by the specifying unit to decide the surface potential of the photoconductor when development by the developing unit is started based on the detected amount of adhering developer material and the calculated surface potential; and a setting unit for setting an image forming condition based on the surface potential decided by the deciding unit.

Since the digital image forming apparatus can decide the development start potential automatically in the apparatus and decide the image forming condition according to the decided development start potential, an optimal image forming condition can always be decided in consideration of the development start potential, allowing formation of an optimal image.

According to a further aspect of the present invention, an image forming apparatus for converting image data into light emission data, indicating the quantity of light emission based on γ correction data, to form an image based on the light emission data includes: an image forming unit for forming an image and including a photoconductor, a charging unit for charging the photoconductor, an exposing unit for exposing the photoconductor charged by the charging unit to light modulated by the light emission data to form an electrostatic latent image on the photoconductor, a developing unit for developing, with a developer material, the electrostatic latent image on the photoconductor formed by the exposing unit, and a transferring unit transferring the image developed by the developing unit on a transfer material; a detecting unit for detecting the amount of developer material adhering to the image on the photoconductor developed by the developing unit; a first specifying unit for specifying the sensitivity characteristic of the photoconductor; a second specifying unit for specifying the development characteristic of the developing unit based on the sensitivity characteristic specified by the first specifying unit and the amount of adhering developer material detected by the detecting unit; a third specifying unit for specifying the transfer characteristic of the transferring unit; a deciding unit for deciding an optimal operating condition of the image forming unit based on the development characteristic of the developing unit specified by the second specifying unit and the transfer characteristic specified by the third specifying unit; and a calculating unit for calculating γ correction data for obtaining a desired gradation characteristic under the operating condition decided by the deciding unit.

Since the digital image forming apparatus can decide the γ correction data with a transfer efficiency taken into consideration, optimal γ correction data can always be decided according to the transfer efficiency, if it changes due to change in the environmental conditions or the like, allowing formation of an image with the desired gradation characteristic.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 18 is a graph of the photoconductor sensitivity characteristics at the time of power-on.

FIG. 30 is a diagram showing the relationship between the amount of toner transferred onto a transfer sheet and the amount of residual toner remaining adhering onto the photoconductor without being transferred.

FIG. 31 is a diagram showing coefficients for transfer efficiency with respect to absolute humidities.

FIG. 32 is a diagram showing coefficients for transfer efficiency with respect to the kinds of paper.

FIG. 33 is a diagram showing coefficients for transfer efficiency with respect to the number of copies which can be made by one copying machine.

DESCRIPTION OF THE PREFERRED EMBODIMENTS

Figure 1:
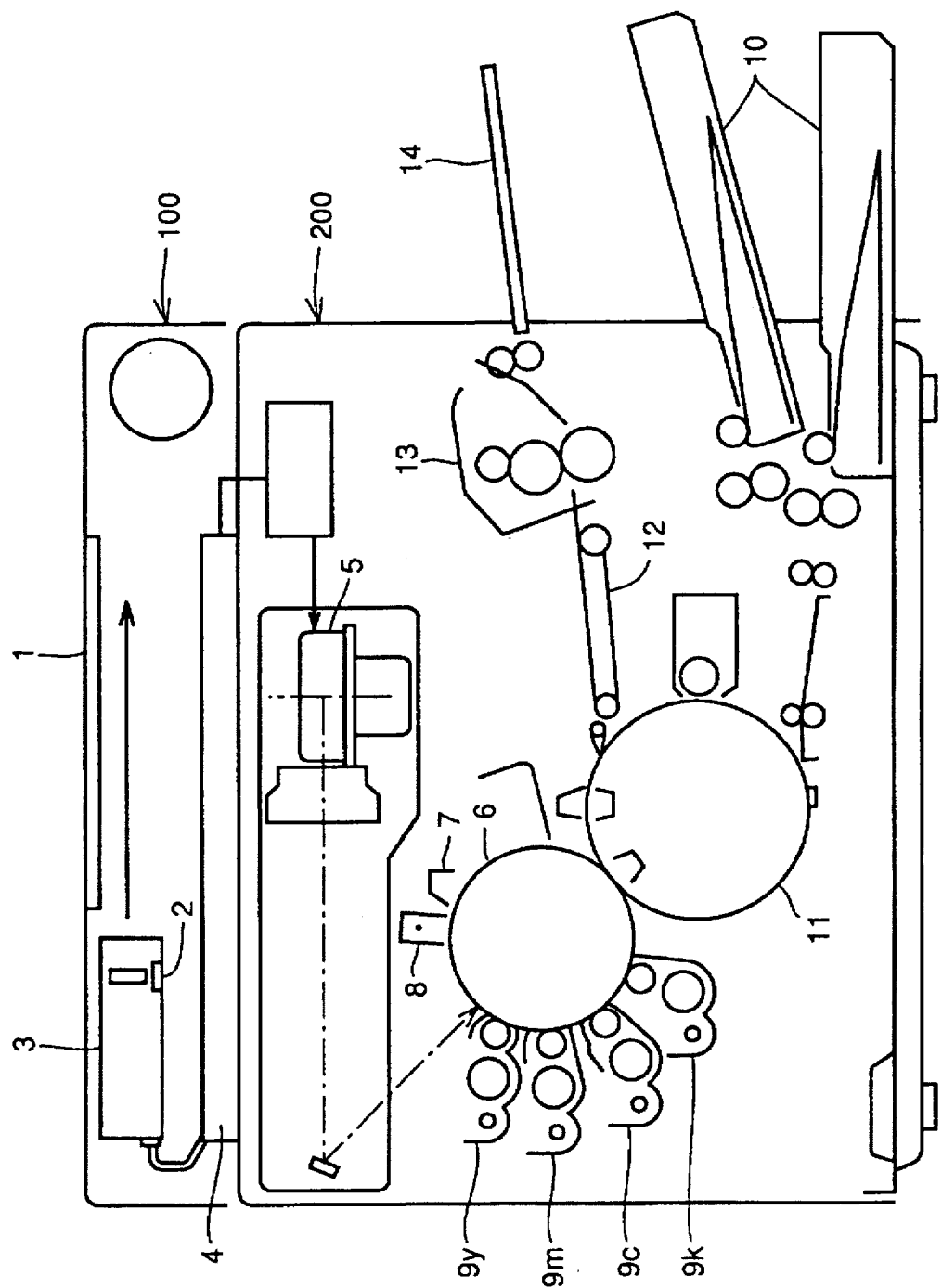
FIG. 1 is a diagrammatic view showing the entire structure of a digital copying machine according to one embodiment of the present invention.

Referring now to the drawings in which the same reference characters designate the same or corresponding parts, a digital copying machine which is a digital image forming apparatus according to one embodiment of the present invention will be described. Although a digital copying machine is described as one example in the following, the present invention can be applied similarly to the other digital image forming apparatuses such as a laser printer.

Referring to FIG. 1, the digital copying machine includes an image reader section 100 and a copying section 200. Image reader section 100 includes a platen 1, a CCD (Charge Coupled Device) sensor 2, an optical unit 3, and an image signal processing unit 4. Copying section 200 includes a print head unit 5, a photoconductor 6, an eraser lamp 7, a corona charger 8, developing devices 9y, 9m, 9c, 9k, a paper feeder 10, a transfer drum 11, a transporting device 12, a fixing device 13, and a discharge tray 14.

The digital copying apparatus of the present embodiment is divided into image reader section 100 reading an original image and copying section 200 reproducing the read image, as described above. In image reader section 100, an original placed on platen 1 is irradiated with light, and the reflected light therefrom is received by optical unit 3 including contact-type CCD sensor 2. In optical unit 3, the reflected light is transduced to multi-level electric signals of three colors of red (R), green (G), and blue (B) pixel by pixel, and the original image is read. The read multi-level electric signals of R, G, and B are converted into 8-bit gradation data for each color of yellow (Y), magenta (M), cyan (C), and black (K) by digital signal processing unit 4.

In copying section 200, print head unit 5 performs gradation correction, that is, γ correction of the received gradation data according to the sensitivity characteristic of photoconductor 6 and the development characteristic of each of developing devices 9y, 9m, 9c, and 9k, and then makes a laser source 216 (cf. FIG. 2) of a semiconductor laser emit light based on the image data after correction. Photoconductor 6 which is driven by rotation is exposed to the laser light emitted from print head unit 5. Photoconductor 6 is irradiated by eraser lamp 7 before exposure for every one copying operation, and charged uniformly by corona charger 8. By photoconductor 6 being exposed in this state, an electrostatic latent image of the original read by image reader section 100 is formed on the surface of photoconductor 6.

Each of developing devices 9y, 9m, 9c, and 9k contains a two-component developer material of toner and carrier, and visualizes the electrostatic latent image formed on photoconductor 6 with toner of corresponding color. Note that developing devices 9y, 9m, 9c, and 9k correspond to toner of colors of Y, M, C, and K, respectively. The reversal development is employed.

The reversal development is a method of making toner adhere to an area exposed to the laser. Therefore, the greater the exposure, the larger the amount of toner adhering to the area, resulting in higher density.

Transfer sheets are fed from paper feeder 10 one by one to be wound around the outer periphery of transfer drum 11. On the other hand, the toner image on photoconductor 6 is transferred onto the transfer sheet sequentially in order of formation based on discharge of a transfer charger in transfer drum 11, and a full color toner image is finally formed on the transfer sheet. The transfer sheet on which the full color toner image is formed is separated from transfer drum 11 and transported by transporting device 12 to fixing device 13, which heats and fixes the toner image on the transfer sheet. Finally, the transfer sheet is discharged to discharge tray 14.

Figure 2:
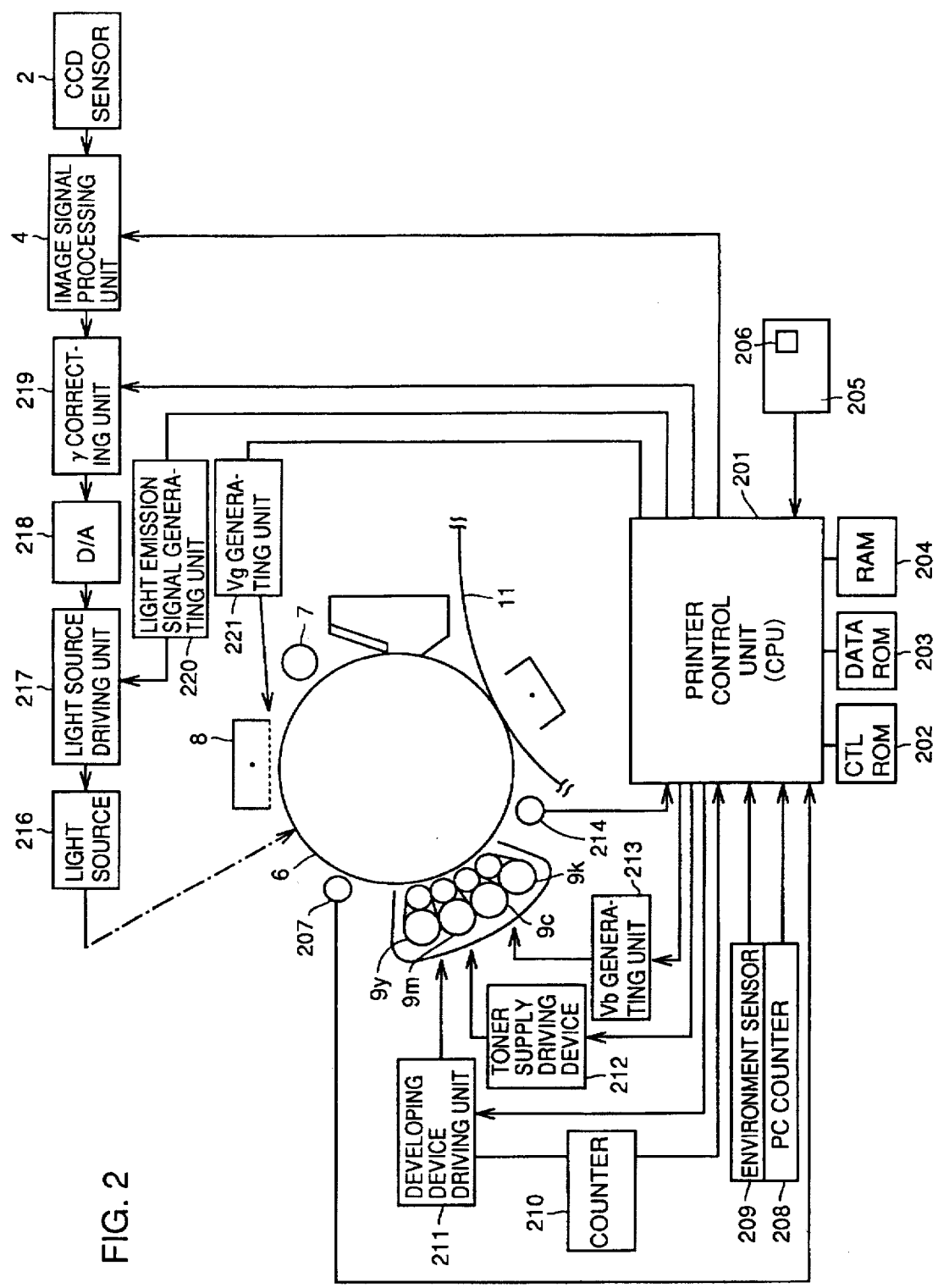
FIG. 2 is a block diagram showing the configuration of a printer control system of the digital copying machine shown in FIG. 1.

Referring to FIG. 2, the digital copying machine further includes a printer control unit 201, a control ROM (Read Only Memory) 202, a data ROM 203, an RAM (Random Access Memory) 204, an operation panel 205 including a reset button 206, a V sensor (surface potential sensor) 207, a photoconductor driving counter 208, an environment sensor 209, a developing device driving counter 210, a developing device driving circuit 211, a toner supply driving device 212, a Vb generating unit 213, an AIDC sensor (density sensor) 214, a light source 216, a light source driving unit 217, a D/A converting circuit 218, a γ correcting unit 219, a light emission signal generating circuit 220, and a Vg generating unit 221.

Control ROM 202, data ROM 203, and RAM 204 are connected to printer control unit 201. Various kinds of control programs are stored in control ROM 202. Various kinds of data required for automatic density control and γ correction control to be described later are stored in data ROM 203. Printer control unit 201 carries out printing operation control based on the various kinds of data stored in control ROM 202, data ROM 203, and RAM 204, as well as the automatic density control and the γ correction control to be described later.

Operation panel 205, photoconductor driving counter 208, and environment sensor 209 are further connected to printer control unit 201. AIDC sensor 214, developing device driving counter 210, and V sensor 207 are also connected to printer control unit 201. Printer control unit 201 receives various kinds of operation commands from operation panel 205, a reset signal from reset button 206, a detect signal obtained by detecting the surface potential of photoconductor 6 from V sensor 207, a detect signal obtained by optically detecting the amount of toner adhering to the surface of photoconductor 6 from AIDC sensor 214, a signal indicating the number of driving of photoconductor 6 from photoconductor driving counter 208, a signal indicating the environmental characteristic such as temperature and humidity from environment sensor 209, and a signal indicating the number of driving of each of developing devices 9y, 9m, 9c, and 9k from developing device driving counter 210.

Printer control unit 201 controls Vg generating unit 221 generating a grid potential Vg of corona charger 8 and Vb generating unit 213 generating a development bias potential Vb of each of developing devices 9y, 9m, 9c, and 9k in order to exercise the automatic density control and the γ correction control based on the above described various kinds of input information. Printer control unit 201 provides light emission data for γ correction operated by predetermined processing to be described later to γ correcting unit 219. γ correcting unit 219 performs γ correction to 8-bit image data output from image signal processing unit 4 based on the received light emission data for γ correction. The corrected image data is converted into an analog signal by D/A converting circuit 218 to be output to light source driving unit 217. Light source driving unit 217 makes light source 216 emit light in response to the received analog signal under the control of light emission signal generating circuit 220 controlled by printer control unit 201.

The digital copying machine of the present embodiment is structured as described above, and exercises γ correction control (control for stabilizing image density) by always operating light emission data for γ correction used for γ correction of image data within the machine. Further, the light emission data for γ correction is operated and prepared for every image forming operation by multipoint input sensing by the V sensor and the AIDC sensor. The γ correction control of the present embodiment will be described hereinafter in detail using the flow chart.

Figure 3:
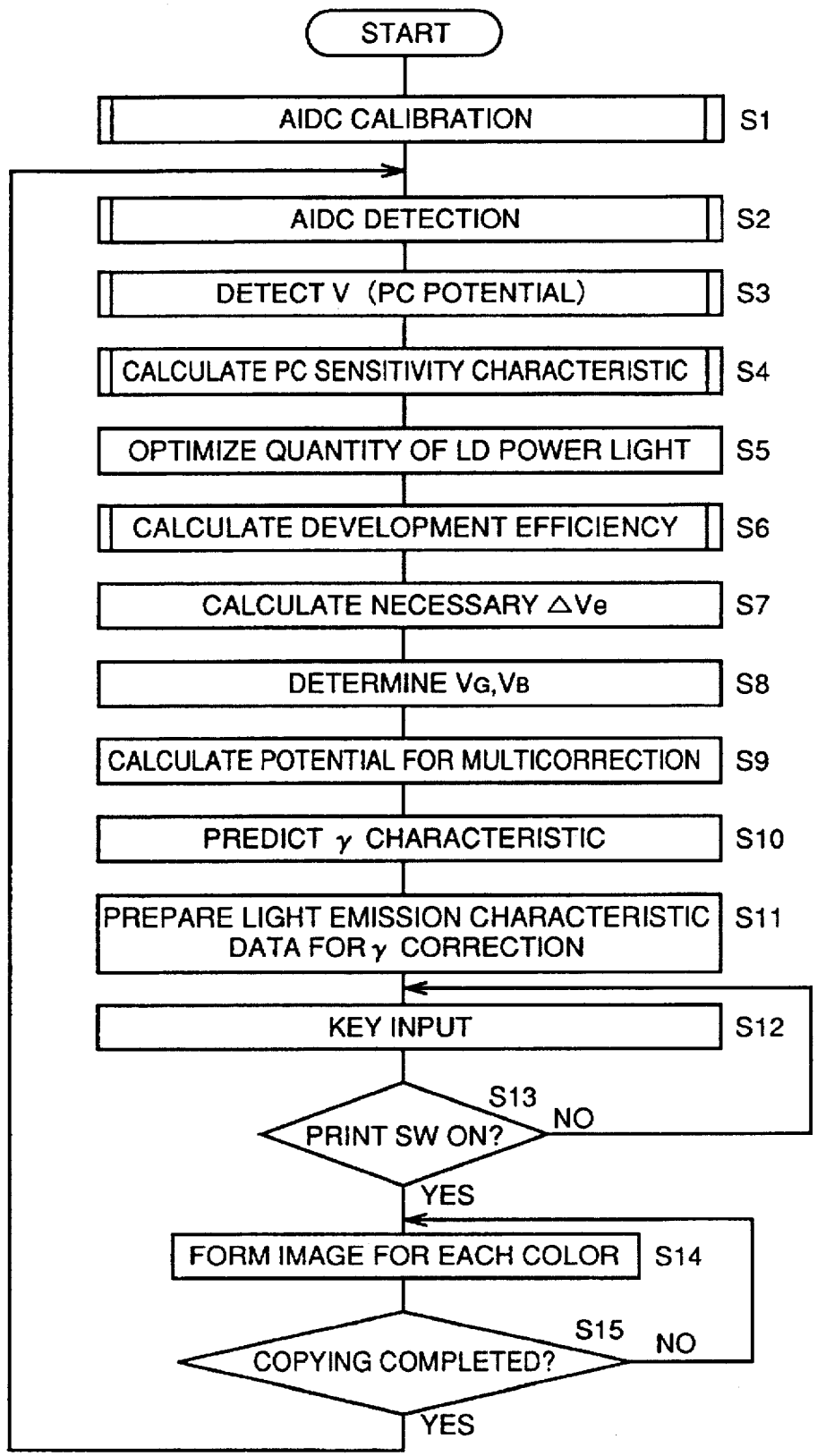
FIG. 3 is a main flow chart of the printer control system of the digital copying machine shown in FIG. 1.

Referring to FIG. 3, when the digital copying machine is powered on, AIDC calibration processing is first carried out at step S1.

AIDC sensor 214 is formed of a light emitting element and a light receiving element. The light emitting element directs light toward photoconductor 6, and the light receiving element receives light reflected from a toner image formed on the surface of photoconductor 6. Since the light receiving element outputs a signal at a level according to the quantity of received light, the signal level output from the light receiving element indicates the amount of adhering toner of the toner image. Therefore, if the light emitting element or the light receiving element of AIDC sensor 214 is stained with a toner particle or the like, the output characteristic of AIDC sensor 214 changes.

Figure 4:
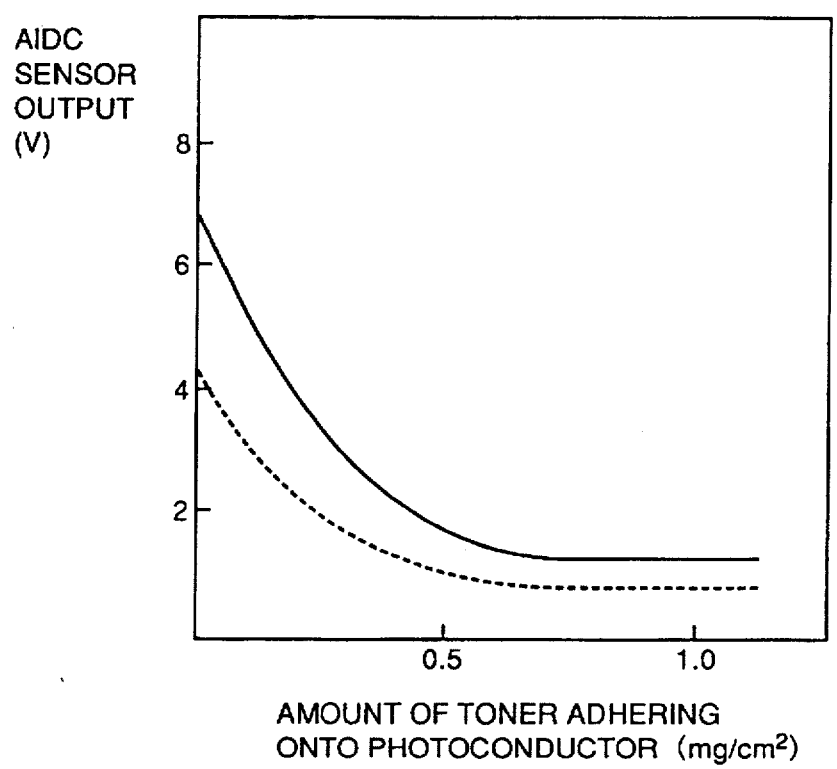
FIG. 4.is a graph of the output characteristic of an AIDC sensor (density sensor) in the cases where there is a toner particle on a light receiving element and there is no toner particle thereon.

FIG. 4 shows the output characteristics for C, M, Y toner. The solid line indicates the case where the AIDC sensor is not stained with a toner particle or the like, and the broken line indicates the case where the AIDC sensor is stained with a toner particle or the like.

When the output characteristic changes from that for the AIDC sensor with a toner particle to that for the AIDC sensor without a toner particle (from the solid line to the broken line) for example, even if the amount of toner adhering onto photoconductor 6 does not change, the accurate amount of adhering toner cannot be detected. This is because the output characteristic of AIDC sensor 214 changes. In order to prevent this, at step S1, a test toner image is formed, the relationship between the output of AIDC sensor 214 and the amount of adhering toner is standardized with the output of AIDC sensor 214 at that time, and the standardized output characteristic is stored in RAM 204 as the output characteristic of AIDC sensor 214.

Figure 5:
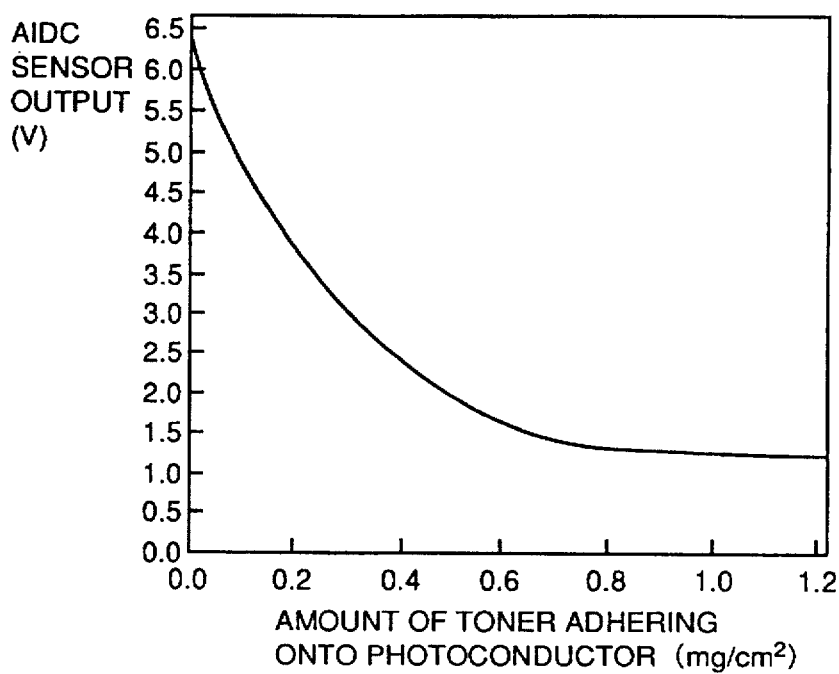
FIG. 5 is a graph of the standardized output characteristic of the AIDC sensor with respect to color toner.
Figure 6:
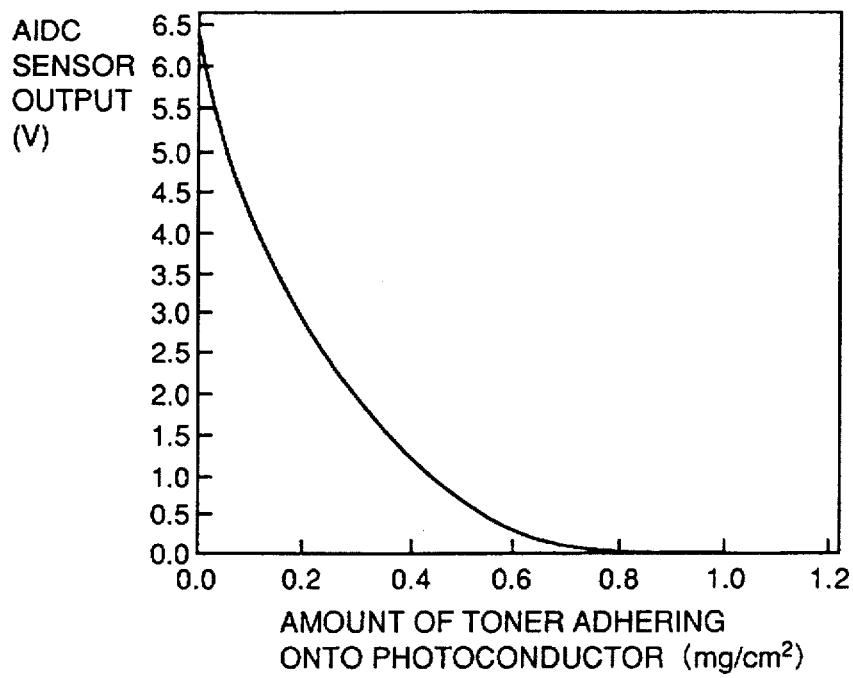
FIG. 6 is a graph of the standardized output characteristic of the AIDC sensor with respect to black toner.

Further, the output characteristic for color toner and that for black toner must be prepared, because color toner and black toner reflect light in different quantity. The output characteristic of the AIDC sensor standardized by the above processing is as shown in FIG. 5 for color toner (cyan toner), and as shown in Fig. 6 for black toner.

The above described calibration processing will be described in more detail.

Figure 7:
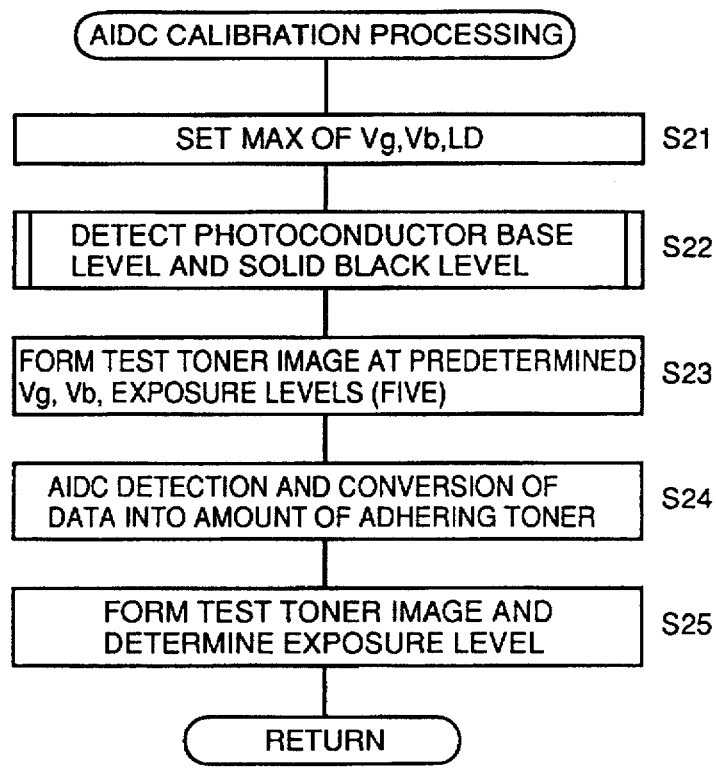
FIG. 7 is a flow chart for describing AIDC calibration processing.

Referring to FIG. 7, at step S21, the respective maximum outputs of grid potential Vg, development bias potential Vb, and exposure LD are first set in order to obtain output Vab of the AIDC sensor at a solid black level at which the amount of adhering toner is maximized.

At step S22, processing of detecting the photoconductor base level and the solid black level is carried out. First, a test toner image is formed on photoconductor 6 under the conditions set at step S21, and output Vab of the AIDC sensor at that time is detected. In addition, output Van of the AIDC sensor at the photoconductor base level in the case where no toner image is formed is detected. Then, based on these, the relationship between the sensor output and the amount of adhering toner (the output characteristic of the AIDC sensor) is standardized and stored in RAM 204. As to output Vab of the AIDC sensor at the solid black level, two kinds of sensor output characteristics for a cyan toner image as color toner and a black toner image, for example, the sensor output characteristics shown in FIGS. 5 and 6, are standardized and stored in RAM 204, as described before.

Figure 8:
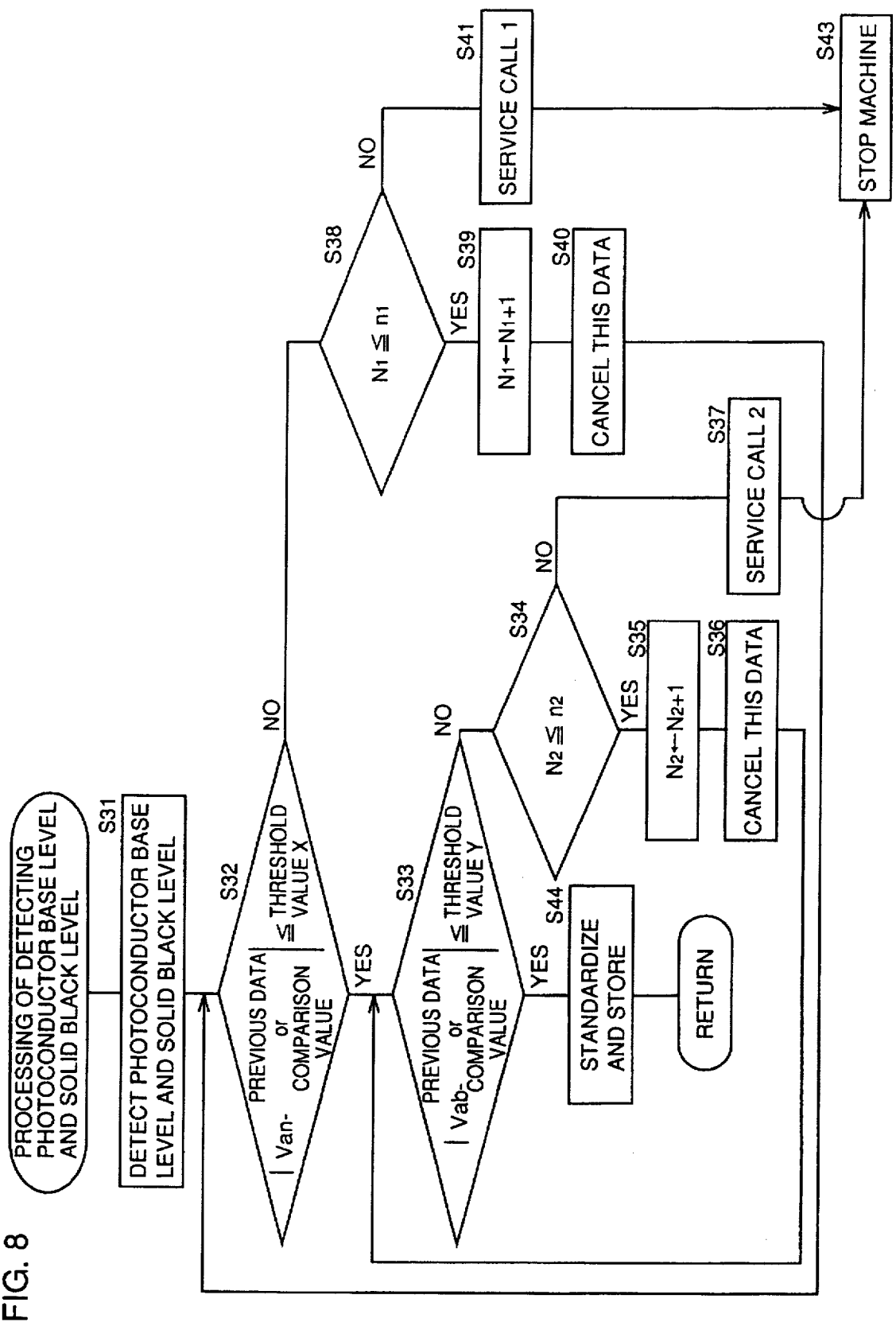
FIG. 8 is a flow chart for describing processing of detecting a photoconductor base level and a solid black level.

Referring to FIG. 8, at step S31, processing of detecting the photoconductor base level and the solid black level is first carried out as described above. Then, at step S32, the previous data or a predetermined comparison value is subtracted from output Van of the AIDC sensor at the base level, and it is determined whether or not its absolute value is at most a predetermined threshold value X. When the absolute value is larger than the predetermined threshold value X, the procedure goes to step S38, and otherwise to step S33.

When the absolute value is the threshold value X or less, the previous data or the comparison value is subtracted from output Vab of the AIDC sensor at the solid black level, and it is determined whether or not its absolute value is at most a predetermined threshold value Y at step S33, as at step S32. When the absolute value is larger than the threshold value Y, the procedure goes to step S34. When the absolute value is the threshold value Y or less, the output characteristic of the AIDC sensor is standardized and stored at step S44, and the procedure goes to step S23 to continue the processing following thereto.

When it is determined that the absolute value is larger than the threshold value Y at step S33, it is determined whether or not $N_2$, indicating how many times the absolute value exceeded the threshold value Y, is at most a predetermined number of times $n_2$ at step S34. If YES at step S34, the number of times $N_2$ is incremented by 1. Then, this data is canceled at step S36, and the procedure goes to step S33 to continue the processing following thereto.

On the other hand, if NO at step S34, the procedure goes to step S37 to carry out service call processing (processing of indicating to the user to call a service man, such as display of a predetermined warning screen on the operation panel). The machine is stopped at step S43.

If NO at step S32, it is determined whether or not $N_1$ (indicating how many times the absolute value exceeded the threshold value X) is at most a predetermined number of times $n_1$ at step S38. When $N_1 \leq n_1$, the procedure goes to step S39 to increment the number of times $N_1$ by 1. Then, the procedure goes to step S40 to cancel this data. The procedure further goes to step S33 to continue the processing following thereto.

On the other hand, if NO at step S38, the procedure goes to step S41 to carry out service call processing. Then, the procedure goes to step S43 to stop the machine.

Referring again to FIG. 7, at step S23, five kinds of test toner images are formed on photoconductor 6 at five exposure levels, that is, in different densities, for each of K toner and C toner under a predetermined grid potential Vg and a predetermined development bias potential Vb. As to the exposure levels, 1 (32 gradation level), 3 (64 gradation level), 5 (96 gradation level), 9 (160 gradation level), and 10 (192 gradation level) are selected from 12 exposure steps shown in FIG. 9.

At step S24, outputs Vab of the AIDC sensor for the formed test toner images for each color are detected. Based on the detected outputs Vab, the amount of adhering toner is found by referring to the output characteristic of AIDC sensor 214 stored in RAM 204 obtained at step S22.

Figures 9, 10:
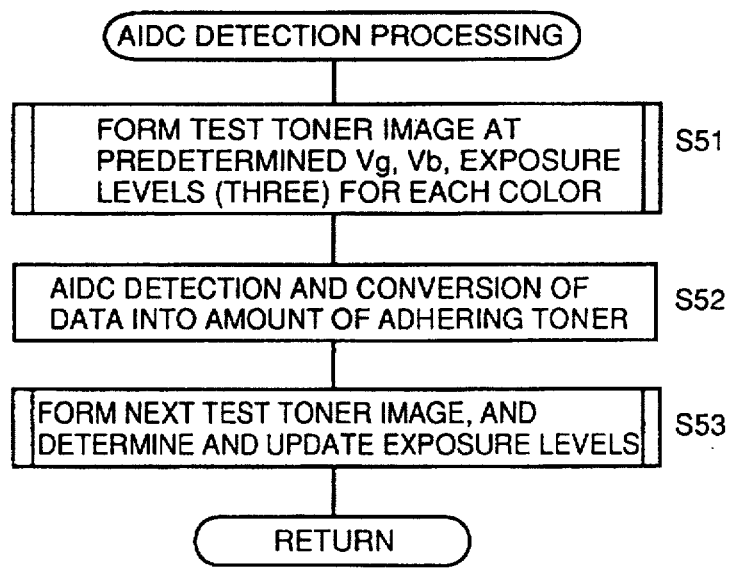
FIG. 9 is a diagram showing the relationship between exposure steps and exposure levels.
FIG. 10 is a flow chart for describing AIDC detection processing.

At step S25, based on the amount of adhering toner obtained at step S24, three exposure levels at which the amount of adhering toner for each color is within a range of 0.05 mg/cm$^2$ to 0.5 mg/cm$^2$ are selected from FIG. 9 for storage.

Such exposure levels as described above are selected because of the following reason. Since a component of the quantity of regular reflection light on the surface of photoconductor 6 is decreased as the amount of adhering toner becomes larger, the output of AIDC sensor 214 is decreased. This causes the detection sensitivity of the sensor to reduce. When the amount of adhering toner exceeds a predetermined amount, the output of AIDC sensor 214 is completely saturated. Therefore, in order to improve the sensor detection accuracy, the approximate amount of adhering toner is preferably within a range of 0.05 mg/cm$^2$ to 0.5 mg/cm$^2$ in the present embodiment.

Referring again to FIG. 3, after the AIDC calibration processing, the AIDC detection processing is carried out at step S2. This processing is a subroutine for detecting the amount of adhering toner using AIDC sensor 214.

First, 12 kinds (three exposure levels×four colors) of test toner images are formed on photoconductor 6 under predetermined grid potential Vg and development bias potential Vb. The three exposure levels are those selected at step S25. The amount of adhering toner of each test toner image is detected using AIDC sensor 214. More specifically, the amount of adhering toner corresponding to the output of AIDC sensor 214 is found using the output characteristic of the AIDC sensor obtained at step S22.

The above described AIDC detection processing will be described in more detail with reference to FIG. 10.

At step S51, under predetermined grid potential Vg (the same as used at step S23), predetermined bias potential Vb (the potential switched according to each color based on a predicted dark decay ratio), and the conditions of three exposure levels selected at step S25, three test toner images (test toner image M1 of low density, test toner image M2 of intermediate density, and test toner image M3 of high density) are formed on photoconductor 6 for each color.

The processing conducted at step S51 will be described in more detail with reference to FIGS. 11 to 13.

Figure 11:
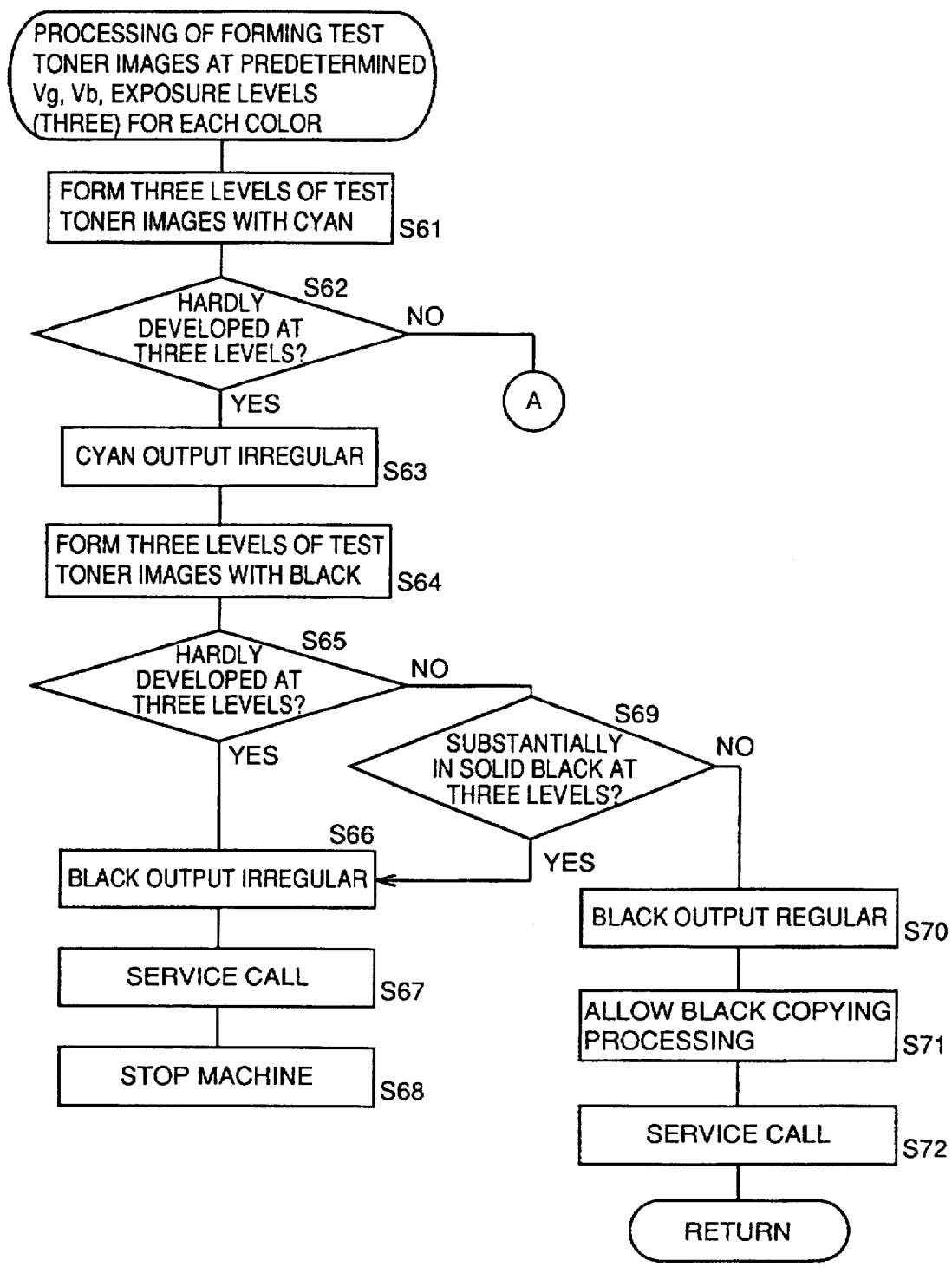
FIG. 11 is a first flow chart for describing processing of forming test toner images at three levels for each color.

Referring to FIG. 11, three levels of test toner images are formed with cyan toner at step S61. Then, it is determined whether or not the three levels of test toner images are hardly developed at step S62. If YES at step S62, the procedure goes to step S63. If NO at step S62, the procedure goes to step S81 shown in FIG. 12.

If YES at step S62, the output at cyan development is determined to be irregular at step S63. Then, three levels of test toner images are formed with black toner at step S64. Then, it is determined whether or not the three levels of test toner images are hardly developed at step S65. If YES at step S65, the procedure goes to step S66. If NO at step S65, the procedure goes to step S69.

If YES at step S65, the output at black development is determined to be irregular at step S66. The service call processing is carried out at step S67. Then, the machine is stopped at step S68.

On the other hand, if NO at step S65, it is determined whether or not the three levels of test toner images are output substantially in a solid black state at step S69. IF YES at step S69, the procedure goes to step S66, and continues the processing following thereto. If NO at step S69, the procedure goes to step S70.

At step S70, the output at black development is determined to be regular. Then, only black copying processing using black toner is allowed at step S71. Then, the service call processing is carried out at step S72, and the procedure goes to step S52 shown in FIG. 10.

Figure 12:
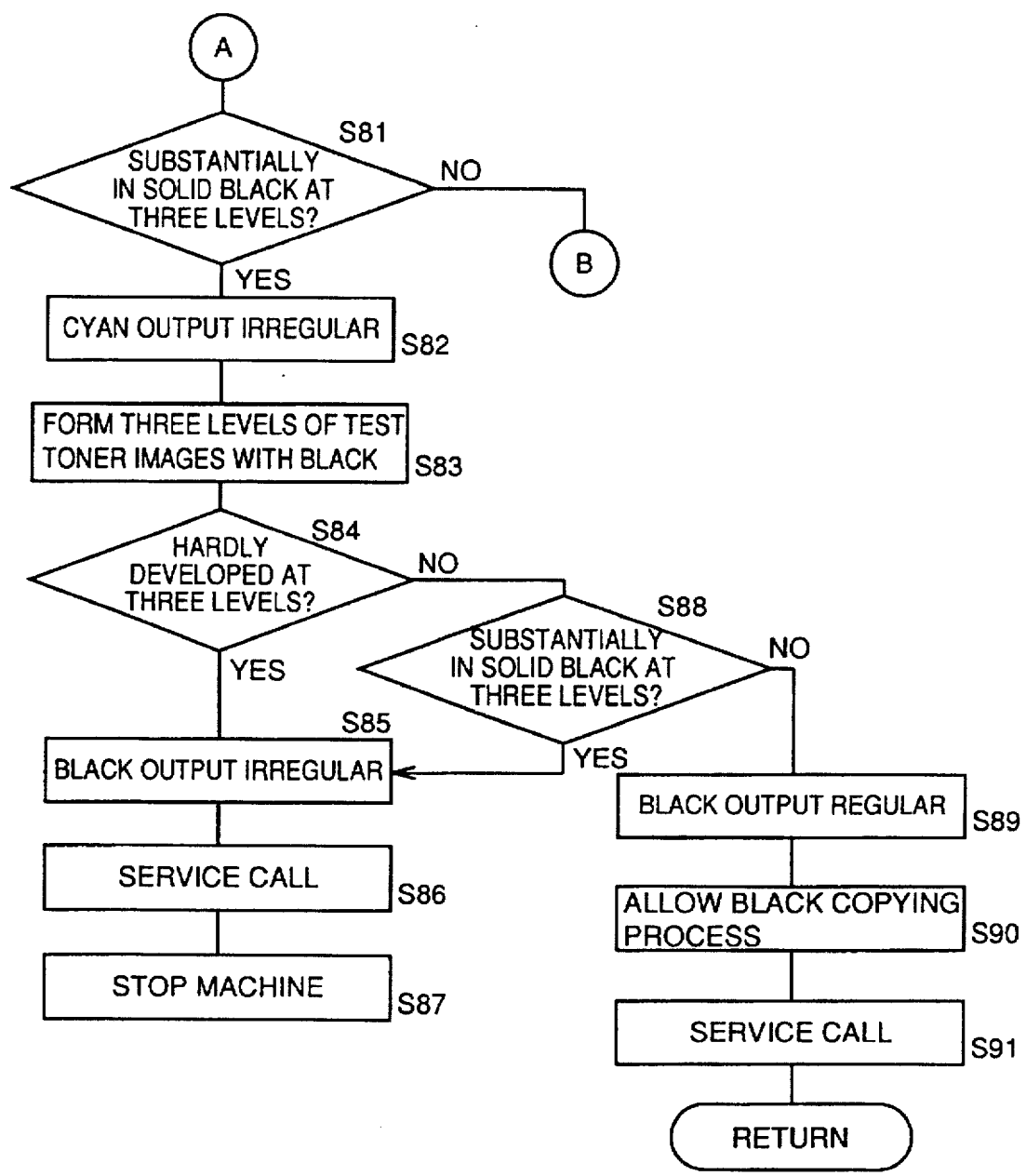
FIG. 12 is a second flow chart for describing processing of forming test toner images at three levels for each color.

On the other hand, if NO at step S62, it is determined whether or not the three levels of test toner images using cyan toner are output substantially in a solid black state at step S81 shown in FIG. 12. If YES at step S81, the procedure goes to step S82, and otherwise, to step S101 shown in FIG. 13.

If YES at step S81, the output at cyan development is determined to be irregular at step S82. Since steps S83 to S91 are similar to the above described steps S64 to S72, the description thereof will not be repeated.

Figure 13:
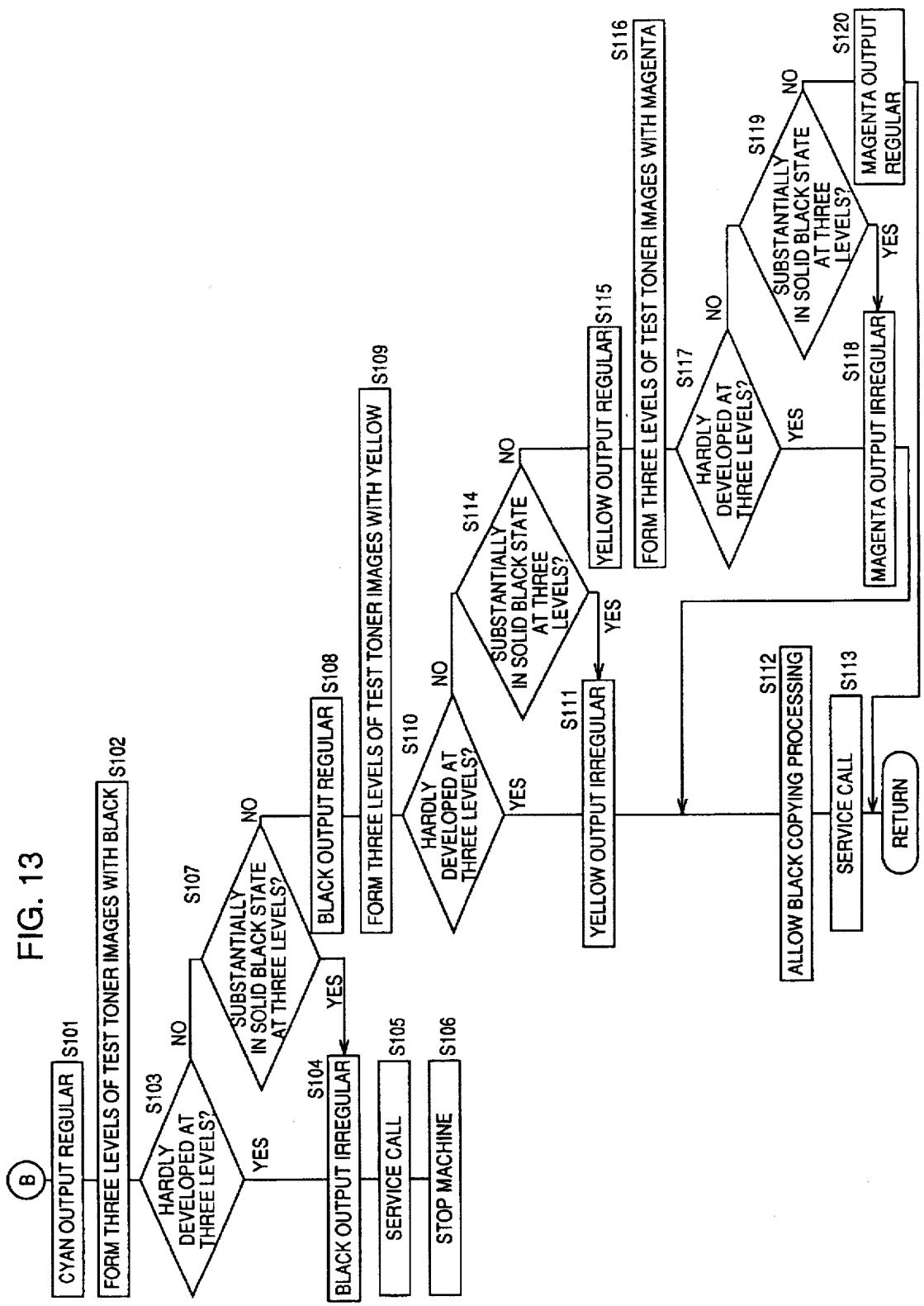
FIG. 13 is a third flow chart for describing processing of forming test toner images at three levels for each color.

On the other hand, if NO at step S81, the output at cyan development is determined to be regular at step S101 shown in FIG. 13. At step S102, three levels of test toner images with black toner are formed. Then, it is determined whether or not the three levels of test toner images are hardly developed at step S103. If YES at step S103, the procedure goes to step S104, and if NO at step S103, the procedure goes to step S107.

If YES at step S103, the output at black development is determined to be irregular at step S104. Then, the service call processing is carried out at step S105. At step S106, the machine is stopped.

If NO at step S103, it is determined whether or not the three levels of test toner images are output substantially in a solid black state at step S107. If YES at step S107, the procedure goes to step S104, and continues the processing following thereto. If NO at step S107, the procedure goes to step S108.

At step S108, the output at black development is determined to be regular. Three levels of test toner images are formed with yellow toner at step S109. Then, it is determined whether or not the three levels of test toner images are hardly developed at step S110. If YES at step S110, the procedure goes to step S111, and otherwise to step S114.

At step S111, the output at yellow development is determined to be irregular. Then, only black copying processing is allowed at step S112. The service call processing is carried out at step S113, and the procedure goes to step S52.

If NO at step S110, it is determined whether or not the three levels of test toner images are output substantially in a solid black state at step S114. If YES at step S114, the procedure goes to step S111, and continues the processing following thereto. If NO at step S114, the procedure goes to step S115. The output at yellow development is determined to be regular at step S115.

Three levels of test toner images are formed using magenta toner at step S116. It is determined whether or not the three levels of test toner images are hardly developed at step S117. If YES at step S117, the procedure goes to step S118. The output at magenta development is determined to be irregular at step S118, and the procedure goes to step S112. On the other hand, if NO at step S117, it is determined whether or not the three levels of test toner images are output substantially in a solid black state at step S119. If YES at step S119, the procedure goes to step S118, and continues the processing following thereto. If NO at step S119, the procedure goes to step S120. The output at magenta development is determined to be regular, and the procedure goes to step S52.

By the above described processings, when the cyan output is regular, if the black output is regular and at least one of the yellow output and the magenta output is irregular, only black copying is allowed. Color copying is not allowed. When the outputs of all the colors are regular, full color copying is allowed. When the black output is irregular, the machine is stopped.

Referring again to FIG. 10, the density of the test toner image is detected by AIDC sensor 214 provided in the vicinity of photoconductor 6 at step S52. Output value Va detected for each color is subject to the similar processing as that of step S1. The output characteristic of the AIDC sensor stored at step S22 is read out from RAM 204, and output Va of the AIDC sensor is converted into the amount of adhering toner using the output characteristic.

Then, at step S53, the exposure levels for the next test toner images are determined and updated based on the result of step S52. More specifically, three exposure levels of the next test toner images to be formed at step S51 are determined for each color, based on data updated at step S53. Therefore, the procedure returns not to step S1 to carry out the AIDC calibration processing every time copying is completed, but to the AIDC detection processing at step S2 to determine three exposure levels for the next test toner images at the time of ordinary test toner detection at step S2.

The processing of determining and updating the exposure levels at step S53 will be described in detail with reference to FIG. 14. In the present embodiment, three exposure levels (exposure steps STP1 to STP3) are selected by the following processing from the exposure levels shown in FIG. 9 for each color, so that the amount of adhering toner is within a range of 0.05 mg/cm$^2$ to 0.5 mg/cm$^2$, as described above.

Figure 14:
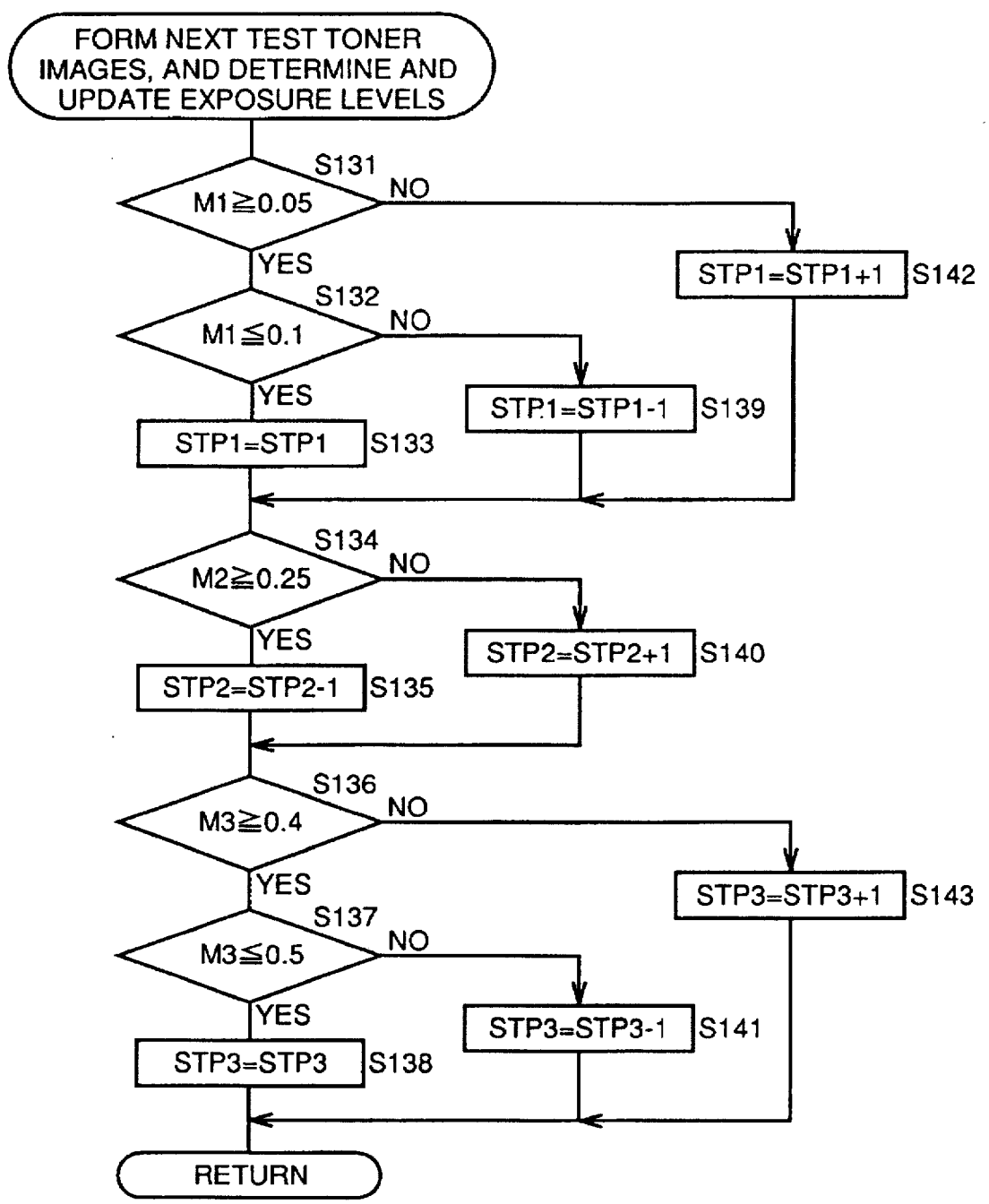
FIG. 14 is a flow chart for describing processing of determining and updating the exposure levels.

Referring to FIG. 14, it is determined for each color whether or not the amount of toner adhering to test toner image M1 of low density detected at step S52 is at least 0.05 mg/cm$^2$ at step S131. If NO at step S131, the procedure goes to step S142 to increase exposure step STP1 of low density by one step according to FIG. 9. Then, the procedure goes to step S134.

If YES at step S131, the procedure goes to step S132. At this step, it is determined whether or not the amount of toner adhering to test toner image M1 is at most 0.1 mg/cm$^2$. If NO at step S132, the procedure goes to step S139. Exposure step STP1 is decreased by one step according to FIG. 9. The resultant exposure step is set as an exposure level of low density at the time of formation of the next test toner images, and stored in RAM 204.

On the other hand, if YES at step S132, exposure step STP1 is not changed and set as an exposure level at the time of formation of the next test toner images at step S133, and stored in RAM 204.

Then, at step S134, it is determined whether or not the amount of toner adhering to test toner image M2 of intermediate density detected at step S52 is at least 0.25 mg/cm$^2$. If NO at step S134, the procedure goes to step S140. At this step, exposure step STP2 of intermediate density is increased by one step according to FIG. 9, and the resultant exposure step is set as an exposure level of intermediate density at the time of formation of the next test toner images, and stored in RAM 204.

On the other hand, if YES at step S134, the procedure goes to step S135. At this step, exposure step STP2 is decreased by one step, and the resultant exposure step is set as an exposure level at the time of formation of the next test toner images, and stored in RAM 204.

Then, at step S136, it is determined whether or not the amount of toner adhering to test toner image M3 of high density detected at step S52 is at least 0.4 mg/cm$^2$. If NO at step S136, the procedure goes to step S143. At this step, exposure step STP3 of high density is increased by one step according to FIG. 9, and the resultant exposure step is set as an exposure level at the time of formation of the next test toner images of high density, and stored in RAM 204.

If YES at step S136, the procedure goes to step S137. At this step, it is determined whether or not the amount of toner adhering to test toner image M3 is at most 0.5 mg/cm$^2$. If NO at step S137, the procedure goes to step S141. At this step, exposure step STP3 is decreased by one step, and the resultant exposure step is set as an exposure level at the time of formation of the next test toner images of high density, and stored in RAM 204.

If YES at step S137, exposure step STP3 is not changed and set as an exposure level at the time of formation of the next test toner images of high density at step S138, and stored in RAM 204.

By the above described processing, the three exposure levels (exposure steps STP1 to STP3) at the time of test toner image formation are set and updated for each color so that the amount of adhering toner is within a range of 0.05 mg/cm$^2$ to 0.5 mg/cm$^2$. Therefore, when the next test toner images are formed, exposure steps STP1 to STP3 stored in RAM 204 are read out for each color, and the exposure levels are set as described above according to FIG. 9. As a result, the test toner images can always be formed within a range of high detection sensitivity of the AIDC sensor, enabling operation of light emission data for γ correction, to be described later, with high accuracy.

Referring again to FIG. 3, the V (photoconductor surface potential) detection processing is carried out at step S3. The V detection processing is for detecting the surface potential of photoconductor 6 using V sensor 207. More specifically, latent image patterns (test patterns) are formed at ten exposure levels (different from exposure steps shown in FIG. 9) under the conditions of predetermined exposure and predetermined grid potential Vg, and the surface potential of each latent image pattern formed on photoconductor 6 is detected by V sensor 207. In order to improve detection accuracy of the surface potential, the surface potential is detected at 3×10 points at the time of power-on by switching among three kinds of exposure and grid potential Vg and forming latent image patterns at ten exposure levels under each kind of exposure and grid potential Vg. Further, after detection of the surface potential at 3×10 points, the surface of photoconductor 6 is erased by eraser lamp 7 to detect a surface potential Vr after erasure at the time of power-on. Except for the time of power-on, surface potential Vr of the photoconductor after erasure is detected after detecting the surface potential at 10 points. Note that although the surface potential is detected using V sensor 207 in this processing, the surface potential may be predicted by a predetermined operation without being directly detected.

Figure 15:
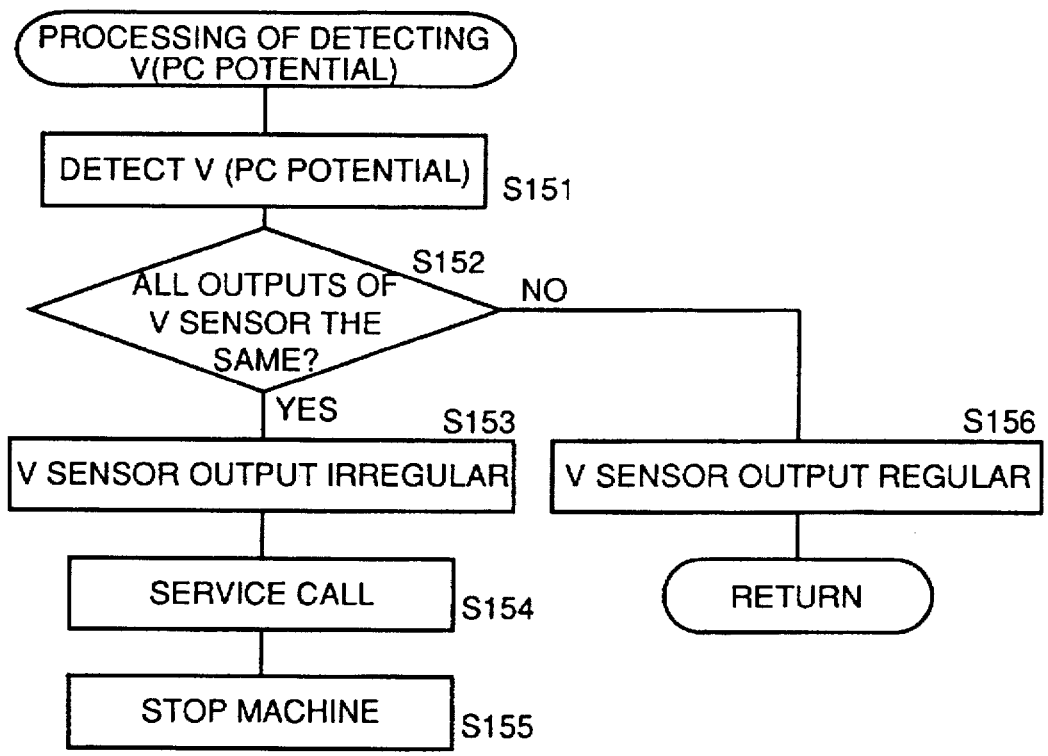
FIG. 15 is a flow chart for describing V detection processing.

The above described V detection processing will be described in more detail with reference to FIG. 15. At step S151, the above described V detection processing is carried out. Then, at step S152, it is determined whether or not all the outputs of V sensor 207 are the same. If YES at step S152, the procedure goes to step S153, and otherwise to step S156.

If YES at step S152, the outputs of V sensor 207 are determined to be irregular at step S153. Then, the service call processing is carried out at step S154. The machine is stopped at step S155.

On the other hand, if NO at step S152, the outputs of V sensor 207 are determined to be regular at step S156. Then, the procedure goes to step S4. By the above described processing, the irregularity of output data of V sensor 207 can be detected to stop the machine.

The detecting operation is completed by the above described steps S1 to S3. At steps following thereto, operation processing is carried out.

Figure 16:
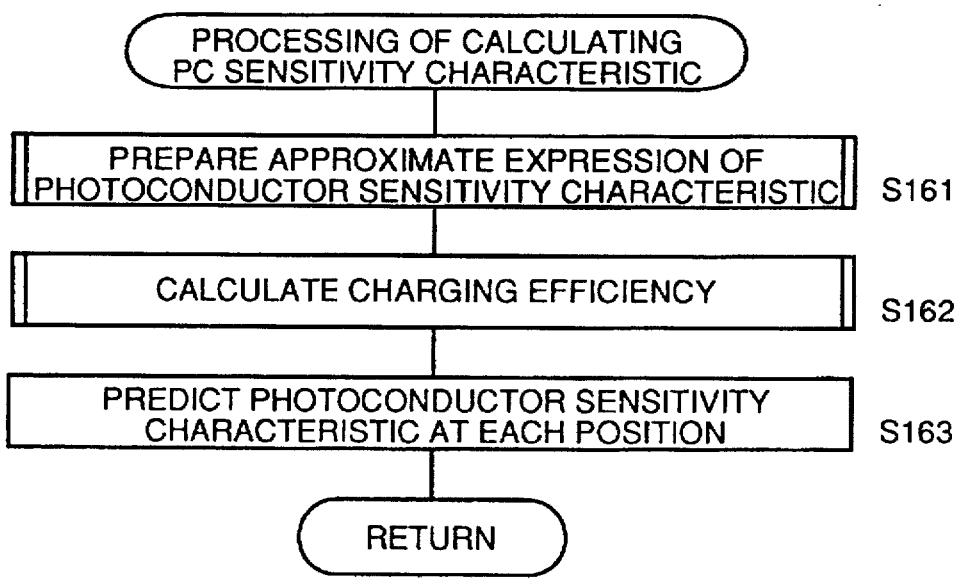
FIG. 16 is a flow chart for describing processing of calculating the photoconductor sensitivity characteristics.

Processing of calculating the photoconductor sensitivity characteristic at step S4 shown in FIG. 3 will be described in detail with reference to FIG. 16. At step S161, processing of preparing an approximate expression of the photoconductor sensitivity characteristic is carried out at step S161. Then, processing of calculating charging efficiency is carried out at step S162. At step S163, each position of the photoconductor sensitivity characteristic is predicted, and the procedure goes to step S5.

Figure 17:
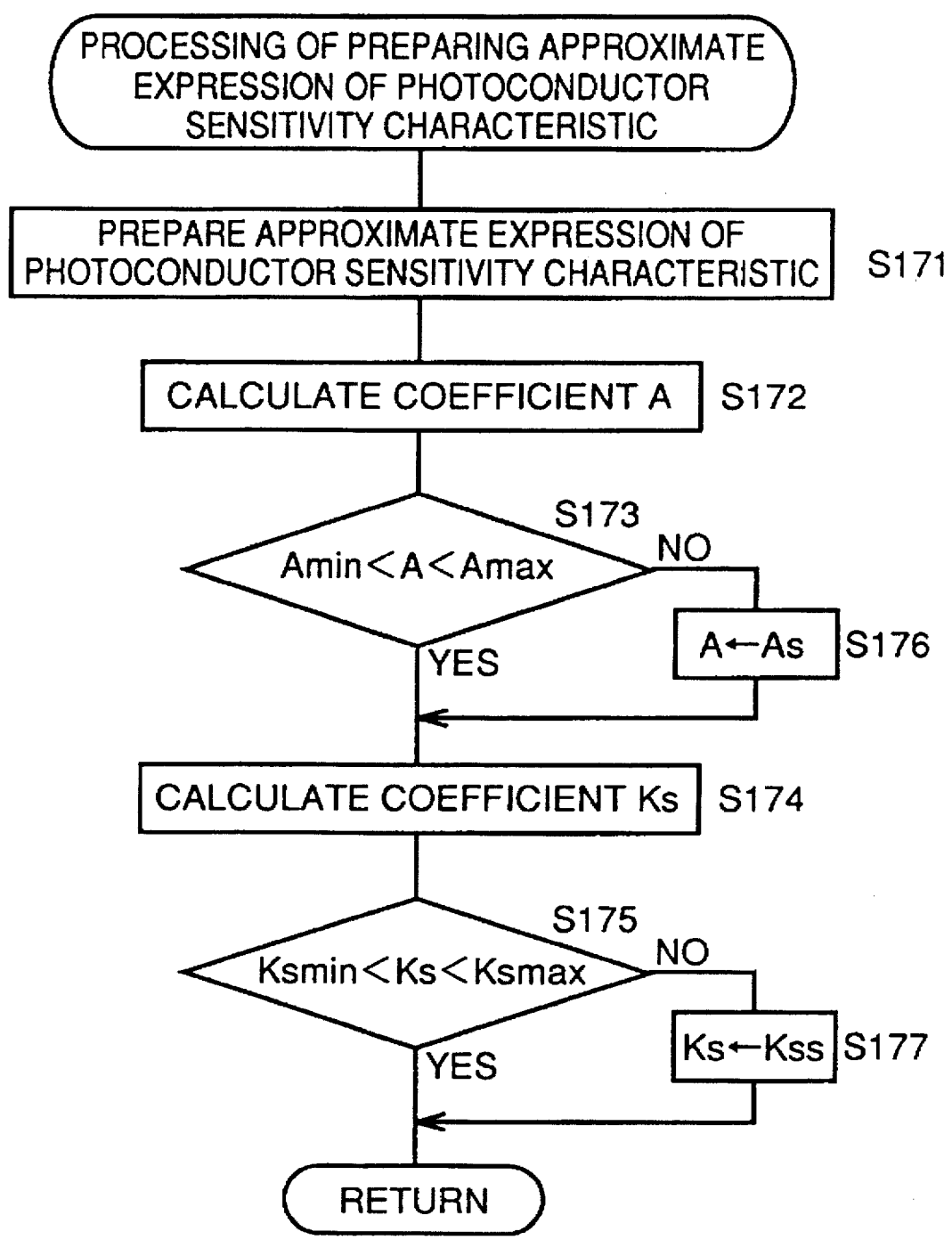
FIG. 17 is a flow chart for describing processing of preparing an approximate expression of the photoconductor sensitivity characteristics.

The above described processing of preparing an approximate expression of the photoconductor sensitivity characteristic will now be described in more detail with reference to FIG. 17.

At step S171, the sensitivity characteristic of photoconductor 6 is calculated. More specifically, a photoconductor bright decay curve is approximated using data of the surface potential of photoconductor 6 for ten levels of latent image patterns detected at step S3. Since the photoconductor bright decay curve has the simple decay characteristic, it can be approximated in a manner of $V \times e^{a^* x + b}$. Each coefficient of $e^{a^* x + b}$ is calculated with a method of least squares.

A method of preparing an approximate expression of the photoconductor bright decay curve will now be described. The curve is approximated in a manner including an exposure ripple based on surface potential V of the photoconductor detected at step S3, so that an effective development potential can be calculated. More specifically, assuming that an antmeter can detect an average potential by the exposure ripple, each coefficient of the following approximate expression is calculated with the method of least squares in the form of an average potential between the maximum value and the minimum value of the ripple.

$$V = (Vbi - Vr) \times (e^{(-B^*E(n)^*D/Ks)} + e^{(-A^*E(n)^*D/Ks)})/2 + Vr \quad (1)$$

$$B = 2 - A + 0.18 \times (A-1)^3 \quad (2)$$

In the above expressions, Vbi is the surface potential under bias exposure ($\neq V_0$), Vr is residual potential, E(n) is subtraction of the quantity of bias light from the average exposure (modulated exposure at each gradation), A is the maximum value under average exposure (coefficient), B is the minimum value under average exposure (coefficient), Ks is the sensitivity coefficient of the photoconductor, D is a ratio of exposure lighting to modulation time, n is gradation for test pattern (n=1 to 10), and "*" in the exponential part indicates "multiplication." Note that a semiconductor laser (laser diode) is used as a light source for image writing in the present embodiment. In order to improve responsiveness of light emission of the laser diode, a bias current is always applied. This bias current causes spontaneous emission of the laser diode. Therefore, the above described Vbi indicates the surface potential of the photoconductor under exposure of this spontaneous light emission.

In the above described approximate expression, surface potential Vbi under bias exposure is used as an initial value of decay because of its detection ease and reliability. Using the coefficients obtained by the above described approximate expression, surface potential V of the photoconductor can be calculated in actual use under arbitrary grid potential Vg and arbitrary exposure.

In order to calculate coefficients A, B, and Ks of the above described approximate expression with the method of least squares, the initial value must be determined first. Initial value Ks0 of Ks is determined according to the following expression:

$$Ks0 = \frac{1}{12} \sum_{m=0}^{2} \sum_{n=0}^{4} \left\{ \frac{E(n,m) \times D - E(0)}{\ln\left(\frac{Vs(n,m) - Vr}{Vbi - Vr}\right)} \right\} \quad (3)$$

In the above expression, Vs (n) is average surface potential (detected potential of each gradation), and n is grid potential Vg of the corona charger. Note that 1.4 is the initial value of A.

Figure 18:
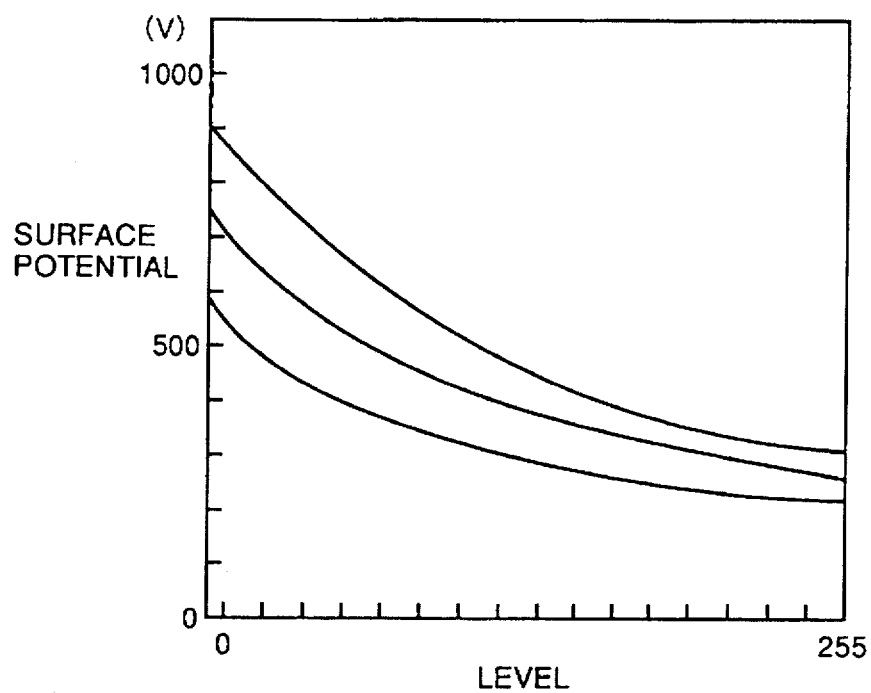

Since the surface potential of the photoconductor is detected under three kinds of exposure and grid potential Vg at the time of power-on, three photoconductor bright decay curves, that is, photoconductor sensitivity characteristic curves are formed as shown in FIG. 18. Except for the time of power-on, the surface potential is detected under one kind of exposure and grid potential Vg, and therefore, one photoconductor sensitivity characteristic curve is formed. Since Ks and A obtained by the above described processing are coefficients for calculating the surface potential of the photoconductor at the position of the V sensor, they are referred to as Ksv and Av in the following description.

Referring again to FIG. 17, processing of calculating coefficient A is carried out at step S172, as described above. Then, it is determined whether or not coefficient A is between predetermined maximum and minimum values Amax and Amin at step S173. If YES at step S173, the procedure goes to step S174, and otherwise, to step S176. At this step S176, coefficient A is changed to a predetermined value As. The previously calculated coefficient A or a predetermined set value is used as As.

At step S174, processing of calculating coefficient Ks is carried out as described above. Then, it is determined whether or not coefficient Ks is between predetermined maximum and minimum values Ksmax and Ksmin at step S175. If YES at step S175, the procedure goes to step S162, and if NO at step S175, the procedure goes to step S177. At this step, coefficient Ks is changed to a predetermined value Kss. The previously calculated coefficient Ks or a predetermined set value is used as Kss.

Coefficient A or Ks is compared with the previous calculation result or the initial set value. When the difference or ratio between them is larger than a set threshold value, the coefficient is determined to be irregular and the previous calculation result or the initial set value may be employed. Then, the procedure may go to the next step. When a predetermined number or more of irregular calculation results continue with respect to the set threshold value, failure of any of photoconductor 6, corona charger 8, Vg generating unit 221, and V sensor 207 may be indicated. Further, the above calculation result may be reset automatically or by reset button 206 by exchanging photoconductors 6, developer materials, AIDC sensors 214, V sensors 207 or the like.

Figure 19:
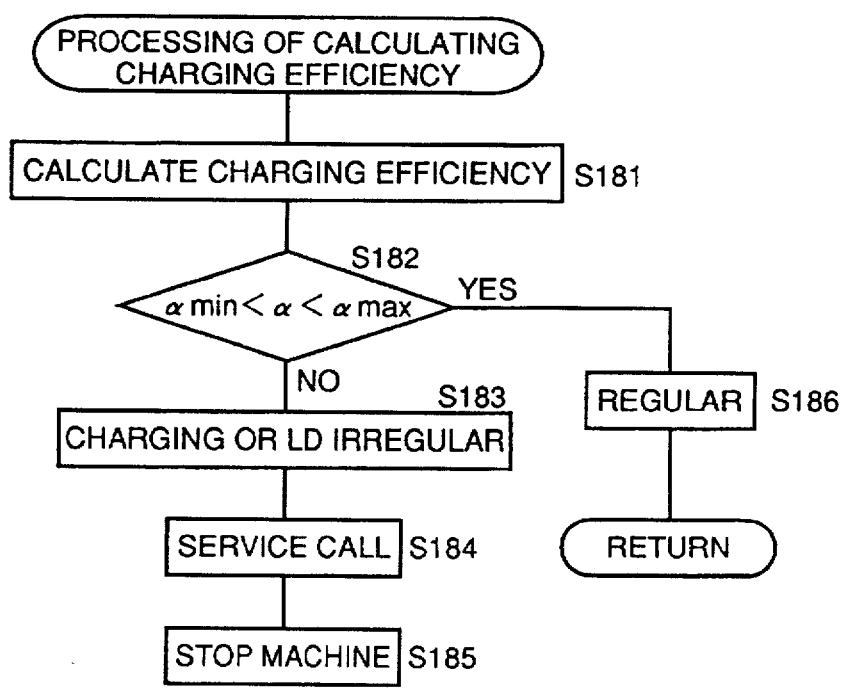
FIG. 19 is a flow chart for describing processing of calculating charging efficiency.

The above described processing of calculating charging efficiency will be described in detail with reference to FIG. 19. First, at step S181, the processing of calculating charging efficiency is carried out. More specifically, the charging efficiency of photoconductor 6 is calculated using the surface potential detected at step S3. The charging efficiency is used for calculating grid potential Vg in order to obtain a desired surface potential to be described later. The charging efficiency is calculated with the relation of surface potential Vbi to grid potential Vg as a linear function. This linear function does not have an intercept or has potential Vr after erasure as an intercept. In order to improve accuracy in actual use, surface potential Vbi is approximated according to the following expression with an intercept.

$$Vbi = \alpha \times Vg + \beta \quad (4)$$

Figure 20:
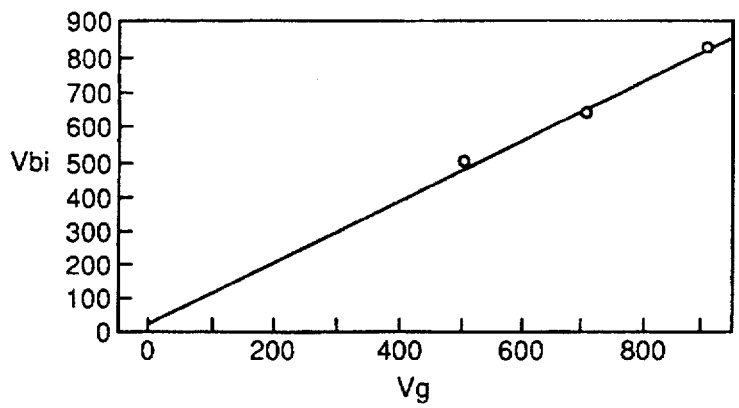
FIG. 20 is a graph of the relationship between surface potential and grid potential.
Figure 21:
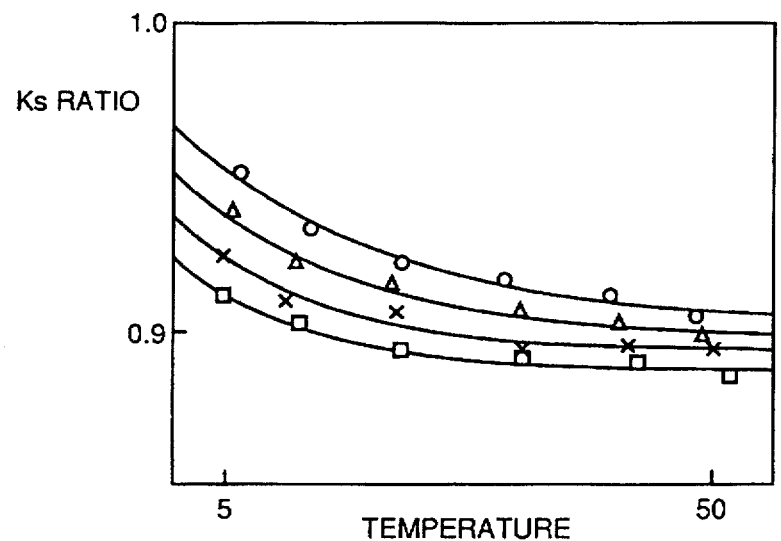
FIG. 21 is a graph of the relationship between temperature and Ks ratio at the position of each developing device.
Figure 22:
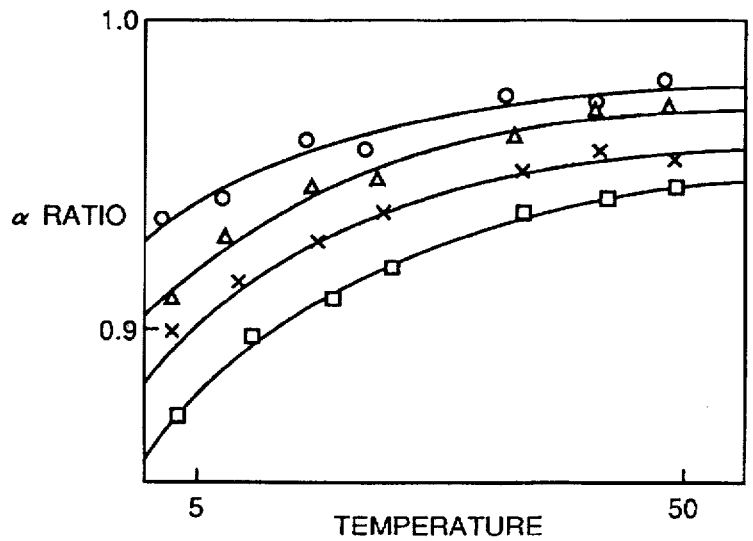
FIG. 22 is a graph of the relationship between temperature and α ratio at the position of each developing device.
Figure 23:
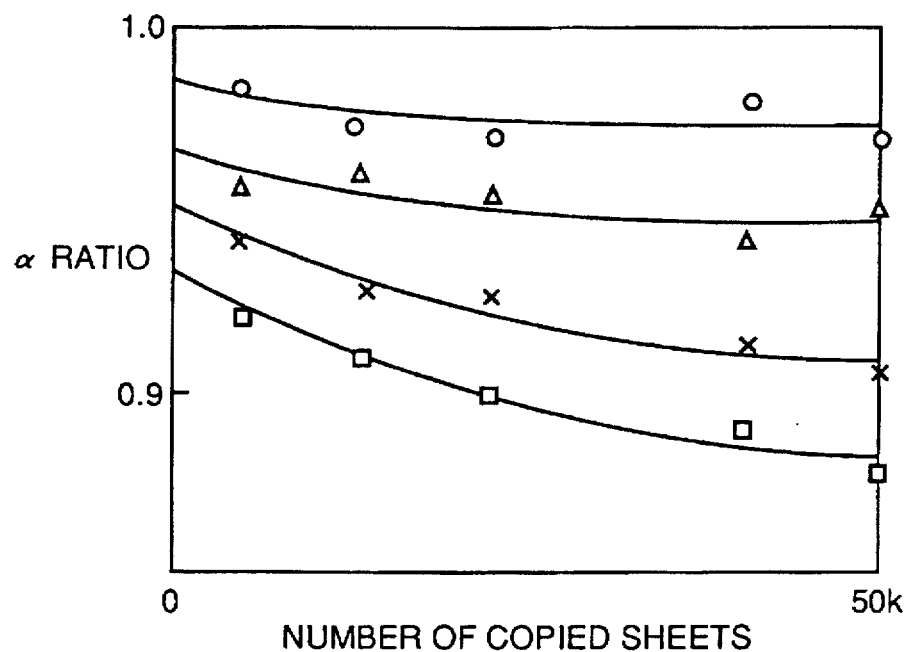
FIG. 23 is a graph of the relationship between the number of printed sheets and α ratio at the position of each developing device.
Figure 24:
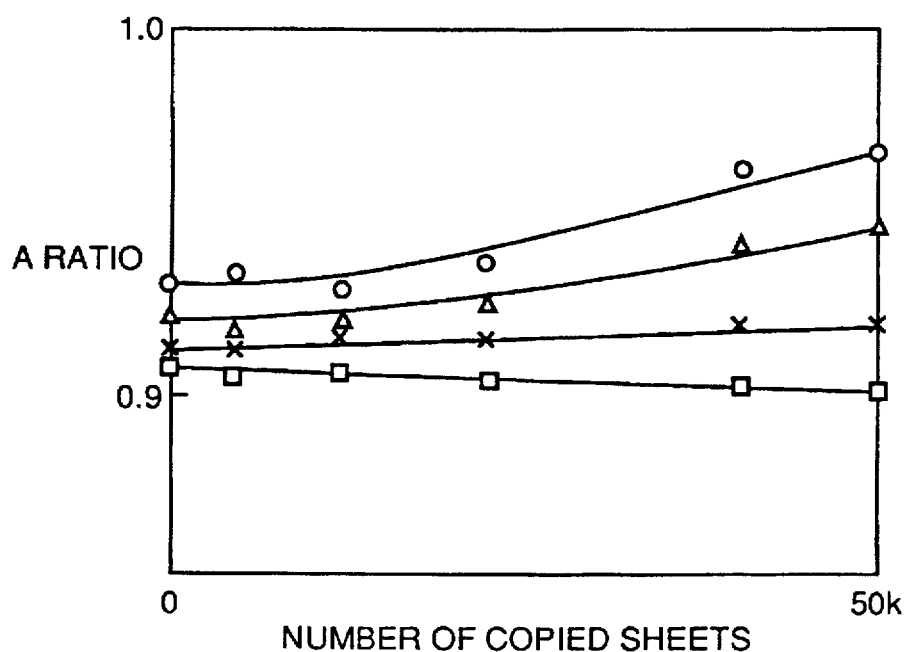
FIG. 24 is a graph of the relationship between the number of printed sheets and A ratio at the position of each developing device.

In the above expression, $\alpha$ is charging efficiency and $\beta$ is intercept. According to the above expression, the relationship between the surface potential and the grid potential shown in FIG. 20, for example, is obtained. Since $\alpha$ and $\beta$ obtained by the above expression are coefficients at the position of V sensor 207, $\alpha$ and $\beta$ are referred to as $\alpha v$ and $\beta v$ in the following description.

Referring again to FIG. 19, it is determined whether or not the calculated charging efficiency $\alpha$ is larger than the preset minimum value $\alpha$min and smaller than the preset maximum value $\alpha$max at step S182. If this condition is satisfied, the procedure goes to step S186. At this step, charging efficiency $\alpha$ is determined to be a regular value, and the procedure goes to step S163.

On the other hand, when the above condition is not satisfied, the procedure goes to step S183, and charging or laser emission is determined to be irregular. Then, the procedure goes to step S184, and the service call processing is carried out. The machine is stopped at step S185.

By the above described processing, when data used for preparing light emission characteristic data for $\gamma$ correction such as coefficients A and Ks and charging efficiency $\alpha$ is irregular, this data can be changed to predetermined data. The user is warned of the necessity of maintenance, and the machine may be stopped. As a result, the user does not use the machine in an irregular state. The user can always use the machine in a favorable state.

The value of coefficient A, Ks, or $\alpha$ is compared with the previous calculation result or the initial set value. When the difference or ratio between them is larger than a set threshold value, the coefficient value is determined to be irregular, and the previous calculation result or the initial set value may be employed. Then, the procedure may go to the next step. When a predetermined number or more of irregular calculation results continue with respect to the set threshold value, failure of any of photoconductor 6, corona charger 8, Vg generating unit 221, and V sensor 207 may be indicated. Further, the above calculation result may be reset automatically or by reset button 206 by exchanging photoconductors 6, developer materials, AIDC sensors 214, V sensors 207 or the like.

Referring again to FIG. 16, the sensitivity characteristic curve of photoconductor 6 is predicted at each development position of developing devices 9y, 9m, 9c, and 9k at step S163. Each coefficient obtained by the above described processing is one at the position of the V sensor. Therefore, the coefficient at each development position is calculated by proportional calculation with respect to one at the position of the V sensor. Since only the sensitivity characteristic of the photoconductor at each development position cannot directly be operated in a series of $\gamma$ correction control, it is to be operated using an empirical rule to be described below.

As to the empirical rule, an analysis of variance was conducted by experiment with environment, film thickness, paper feed mode, pause mode, beam diameter and the like as control factors. The influence of each of the control factors having a higher contribution ratio (approximately 5% or more) is stored in data ROM 203 as predetermined data in a manner of look-up table. The respective ratios of each development position to Av, Ksv, $\alpha v$, and $\beta v$ at the position of V sensor 207 can be obtained.

As specific examples, the relationship between the temperature and the Ks ratio at the position of each developing device, the relationship between the temperature and the $\alpha$ ratio, the relationship between the number of printed sheets and the $\alpha$ ratio, and the relationship between the number of printed sheets and the A ratio are shown in FIGS. 21, 22, 23, and 24, respectively. In these figures, $\circ$ is data relating to the development position of developing device 9y, $\Delta$ is data relating to the development position of developing device 9m, $\times$ is data relating to the development position of developing device 9c, and $\square$ is data relating to the development position of developing device 9k. Each of these data is prestored in data ROM 203 in a manner of look-up table. Therefore, based on data of the prestored look-up table, the photoconductor sensitivity characteristic at each development position can be obtained.

When the copying machine has a function of switching the rotation speed of the photoconductor, the photoconductor sensitivity characteristic at each development position can be predicted by calculating a correction coefficient at a position corresponding to a reach time according to increase/decrease of the speed by switching. Further, when the copying machine has a function of switching print density (resolution), a correction coefficient according to the print density may be selected as described above.

Figure 25:
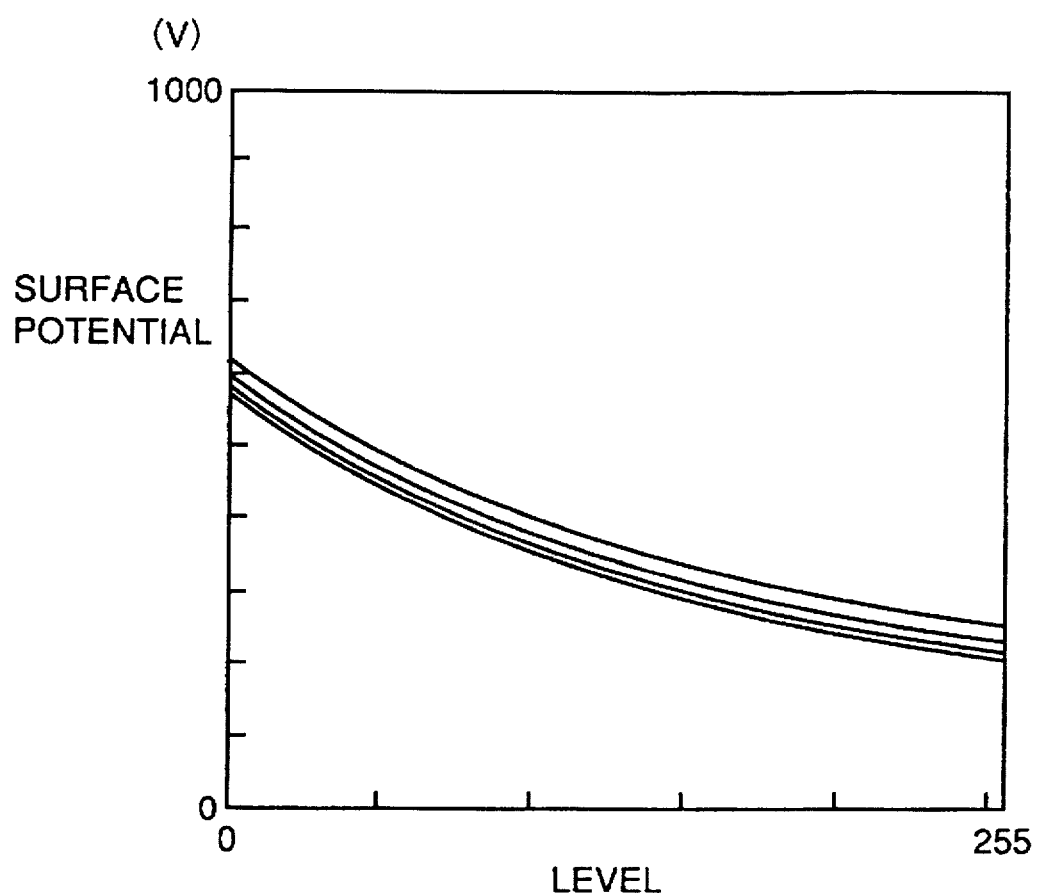
FIG. 25 is a graph of the photoconductor sensitivity characteristics at each development position.

Referring to FIG. 25, the uppermost curve indicates the photoconductor sensitivity characteristic at the position of V sensor 207, and the curves thereunder indicate the photoconductor sensitivity characteristic at each development position of developing devices 9y, 9m, 9c, and 9k in this order. By the above described processing, each coefficient at each development position is calculated using each coefficient at the position of V sensor 207, and finally, the photoconductor sensitivity characteristic at each development position can be obtained.

Referring again to FIG. 3, the quantity of LD power light (the maximum exposure at the time of image formation) is optimized at step S5. The quantity of LD power light is uniquely determined depending on the condition of the photoconductor, without considering the development condition. The quantity of LD power light Pmax (i) is determined to be a value approximately 2.5 times half decay exposure Eh(i) at each development position based on the predicted photoconductor sensitivity characteristic at each development position. When a photoconductor charged with a certain potential is exposed at the exposure position, and then the photoconductor reaches each development position, the potential of the photoconductor is reduced to ½. The above described half decay exposure Eh(i) is required for reducing the potential to ½.

The quantity of LD power light is calculated according to the following expressions.

$$V = (Vbi - Vr) \times (e^{(-A(i) \cdot Eh(i) \cdot D/Ks(i))} + e^{(-A(i) \cdot Eh(i) \cdot D/Ks(i))})/2 + Vr \quad (5)$$

$$V = (Vbi - Vr)/2 + Vr \quad (6)$$

$$V = (Vbi - Vr) \times (e^{(-A(i)*Eha(i)*D/Ea(i))}) + Vr \quad (7)$$

$$V = (Vbi - Vr) \times (e^{(-B(i)*Ehb(i)*D/Ea(i))}) + Vr \quad (8)$$

$$V = (Vbi - Vr)/2 + Vr \quad (9)$$

In the above expressions, i=1 to 4 (wherein i=1, i=2, i=3, and i=4 denote yellow developing device 9y, magenta developing device 9m, cyan developing device 9c, and black developing device 9k, respectively, Eh(1) to Eh(4) denote half decay exposure at each development position of yellow, magenta, cyan, and black, A(1) to A(4), B(1) to B(4), and Ks(1) to Ks(4) denote each coefficient at each development position). The quantity of LD power light may be calculated by finding Eh(i) of the expression (5) satisfying the expression (6). In order to find Eh(i), Eha(i) and Ehb(i) of the expressions (7) and (8) satisfying the expression (9) are respectively found, and these values are averaged as Eh(i). Eh(i) times 2.5 is determined to be Pmax(i). More specifically, Pmax(i) is calculated according to the following expression.

$$Pmax\ (i) = 2.5 \times (-Ks(i)) \times \ln\ (\tfrac{1}{2}) \times (1/A(i) + 1/B(i))/2 \quad (10)$$

According to the above calculation, the quantity of LD power light Pmax(i) of approximately 2.5 times the half decay exposure at each development position (i=1 to 4) is determined.

When the system speed is different between detection and image formation, for example, when the system speed is increased only when a monocolor copy is made, the quantity of LD power light is determined so that the cumulative quantity of light per unit time is equivalent to the quantity of light calculated under the above condition.

Figure 26:
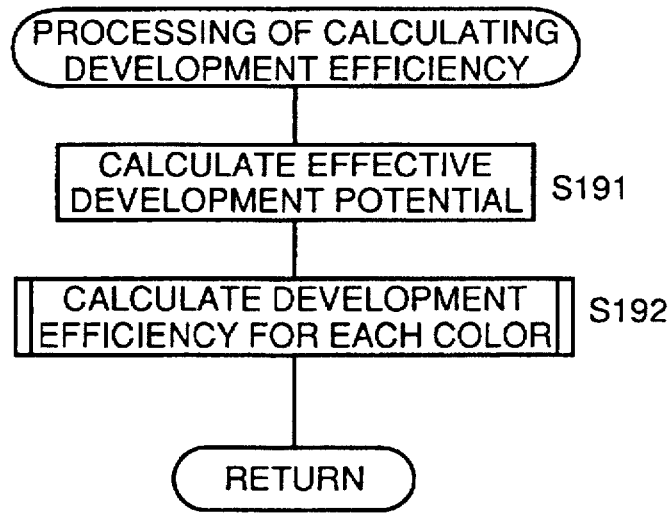
FIG. 26 is a flow chart for describing processing of calculating development efficiency.

The processing of calculating development efficiency shown at step S6 of FIG. 3 will now be described in detail with reference to FIG. 26. First, at step S191, processing of calculating effective development potential is carried out.

More specifically, the effective development potentials of test patterns of 3 gradations×4 colors (hereinafter referred to as "AIDC pattern") formed at step S2 are calculated. In this processing, the effective development potentials are calculated by input of the condition under which the patterns are formed using the predicted photoconductor sensitivity characteristic at each development position.

First, an average development potential Ve (i, n) is calculated according to the following expression.

$$Ve(i,n) = (Vbi(i) - Vr) \times (Ks(i))/\{(B(i) - A(i)) \times \quad (11)$$

$$E(n)\} \times (e^{(-B(i)*B(n)*D/Ea(i))} - e^{(-A(i)*B(n)*D/Ea(i))}) + Vr$$

Then, the quantity of light C(i) satisfying V (C)=Vb+Vmg at each development position under uniform exposure is calculated according to the following expression.

$$C(i) = Ks(i) \times \ln\ \{(Vbi(i) - Vr)/(Vb(i) + Vmg(i) - Vr)\} \quad (12)$$

Here, Vmg is a fog potential (development start potential) correction coefficient, having an initial value of 0.

Then, effective development potential ΔVe (i, n) of the AIDC pattern is calculated. The calculation is conducted in three cases where the exposure ripple is substantially larger than development bias potential Vb, the exposure ripple overlaps development bias potential Vb, and where the exposure ripple is substantially smaller than development bias potential Vb.

When (C(i)/B(i))<E(n)×D (the ripple is substantially larger than Vb), ΔVe (i, n) is calculated according to the following expression.

$$\Delta Ve(i,\ n) = Vb(i) + Vmg(i) - Ve(i,\ n) \quad (13)$$

When (C(i)/A(i))<E(n)×D<(C(i)/B(i)) (the ripple overlaps Vb), ΔVe (i, n) is calculated according to the following expression.

$$\Delta Ve(i,n) = [-1/\{(A(i) - B(i)) \times E(n) \times D\}] \times \{Ks(i) \times (Vbi(i) - Vr) \times \quad (14)$$

$$e^{(-A(i)*B(n)*D/Ea(i))} + (A(i) \times E(n) \times D - C(i) -$$

$$Ks(i)) \times (Vb(i) + Vmg(i) - Vr)\}$$

Finally, when (C(i)/A(i))>E(n)×D (the ripple is substantially smaller than Vb), ΔVe (i, n) is calculated according to the following expression.

$$\Delta Ve(i,\ n) = 0 \quad (15)$$

Referring again to FIG. 26, the processing of calculating development efficiency for each color is carried out at step S192, and the procedure goes to step S7.

Figure 27:
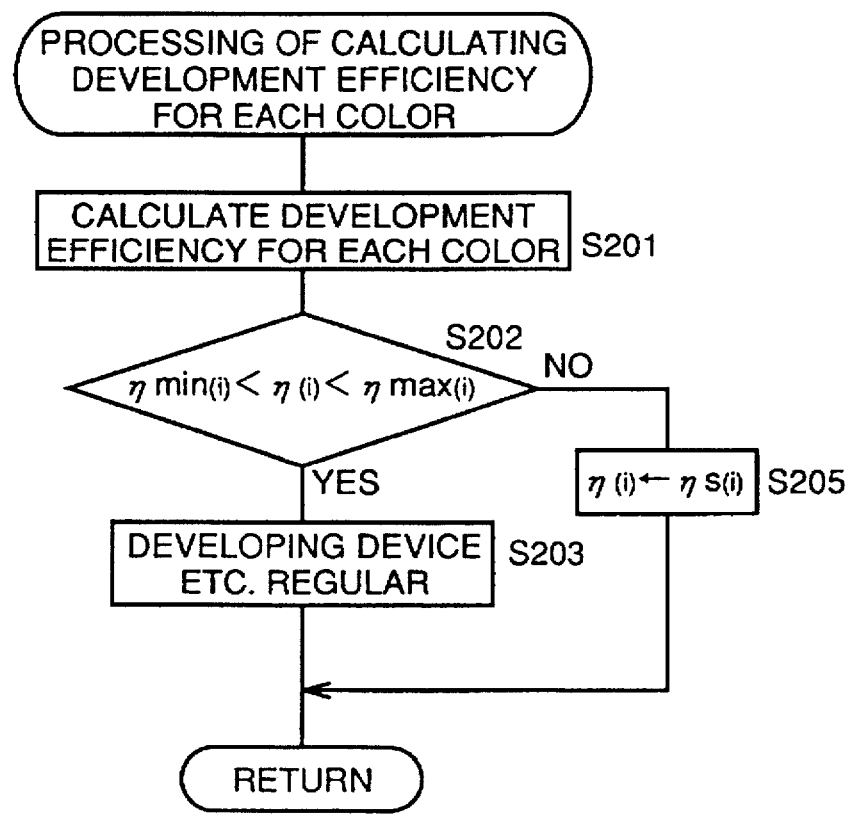
FIG. 27 is a flow chart for describing processing of calculating development efficiency for each color.

The processing of calculating development efficiency for each color will now be described in detail with reference to FIG. 27. First, at step S201, the processing of calculating development efficiency for each color is carried out.

More specifically, the development efficiency is calculated from the amount of adhering toner obtained at step S2 and the above calculated effective development potential. The relationship between the amount of adhering toner and the effective development potential is approximated in a linear expression, and its slope and intercept are found. This slope is the development efficiency. Although the intercept of the linear expression should be 0, the intercept has any value, since the fog phenomenon does not necessarily occur from the level of development bias potential Vb. Therefore, the intercept is used as fog potential correction coefficient Vmg.

Figure 28:
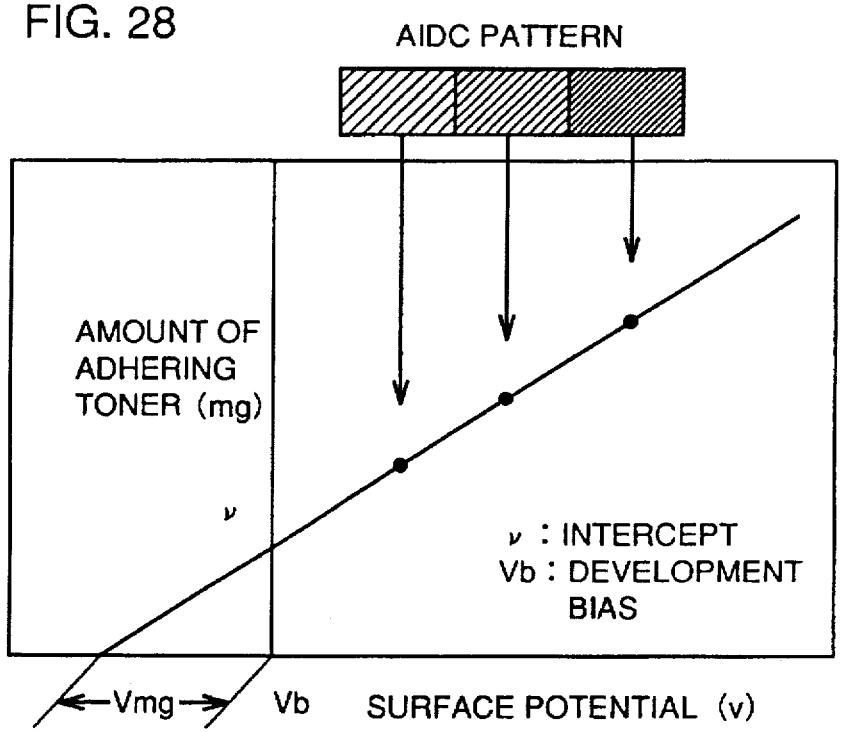
FIG. 28 is a graph of the relationship between surface potential and the amount of adhering toner.

Actual fog potential correction coefficient Vmg is calculated from the slope (development efficiency η(i)) and the intercept (v(i)). FIG. 28 shows the relationship between the surface potential and the amount of adhering toner. As shown in FIG. 28, fog potential correction coefficient Vmg (i) can be calculated according to the following expression.

$$Vmg(i) = v(i)/\eta(i) \quad (16)$$

By recalculating the above described effective development potential using this calculated Vmg(i), the development efficiency can be calculated without intercept (η(i)=0).

Alternatively, operation panel 205 may be provided with an adjustment key for adjusting the fog potential manually. In this case, the service man can correct the fog potential even manually.

Referring again to FIG. 27, it is determined whether or not the calculated development efficiency η(i) is larger than the minimum value ηmin(i) set for each color and smaller than the maximum value ηmax(i) set for each color at step S202. If this condition is satisfied, the procedure goes to step S203, and otherwise to step S205. At this step S203, it is determined that the developing devices and the like are regular, and the procedure goes to step S7.

On the other hand, if the condition at step S202 is not satisfied, development efficiency η(i) is changed to a predetermined value ηs(i) at step S205, and the procedure goes to step S7. The previously calculated value or a predetermined set value is used as ηs(i) here.

The value of development efficiency η(i) is compared with the previous calculation result or the initial set value. When the difference or ratio between them is larger than a set threshold value, the value is determined to be irregular, and the previous calculation result or the initial set value may be employed. Then, the procedure may go to the next step. When a predetermined number or more of irregular calculation results continue with respect to the set threshold value, failure of any of Vb generating unit 213, developing devices 9y, 9m, 9c, and 9k, and AIDC sensor 214 may be indicated, if each calculated coefficient of the photoconductor is regular. Further, the above calculation result may be reset automatically or by reset button 206 by exchanging photoconductors 6, developer materials, AIDC sensors 214, V sensors 207 or the like.

Figure 29:
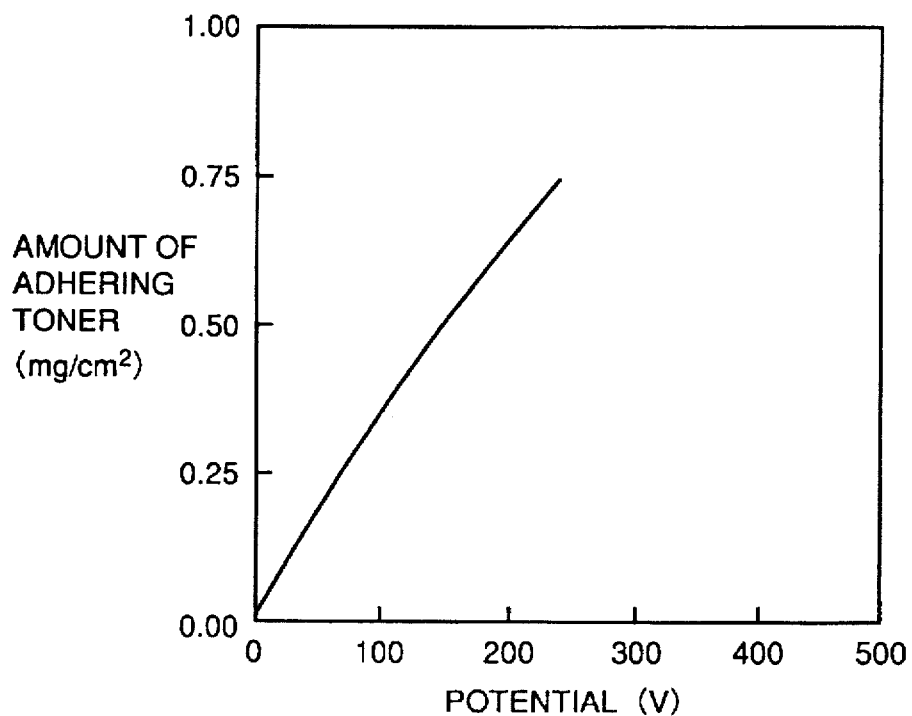
FIG. 29 is a graph of one example of a development characteristic curve.

Referring again to FIG. 3, effective development potential $\Delta$Ve required for each color is calculated at step S7. First, a development characteristic curve is approximated. Although the development characteristic should be linear (potential and amount of adhering toner are in a linear relationship), there may be a case where the development characteristic is not necessarily linear when a large amount of toner adheres under such conditions as low temperature and low humidity and low T/C (the case where the toner content with respect to carrier is low). Therefore, at this step, the development characteristic curve for each color is approximated using the development efficiency calculated by the above described processing, with the slope on the side of a large amount of adhering toner made slightly gentle. FIG. 29 shows one example of the development characteristic curve obtained by the above described processing.

Then, effective development potential $\Delta$Ve required for each color in order to obtain the desired maximum amount of adhering toner (maximum density) is calculated from the quantity of LD power light obtained at step S5 and the development characteristic curve obtained by the above described processing. First, in order to convert the desired maximum amount of adhering toner into the amount on a transfer material, the transfer characteristic is calculated by predictions. The transfer characteristic is predicted by being corrected with at least one of humidity information from environment sensor 209, transfer material information from operation panel 205, and counter information from developing device driving counter 210, using a predetermined coefficient prestored in data ROM 203. In the above correction processing, at least one of the relationship information shown in FIGS. 30 to 33 is used.

In the present embodiment, a target amount of toner adhering onto a sheet is 0.7 mg/cm$^2$. The amount of residual toner ($R_{0.7}$) on photoconductor 6 when the amount of toner adhering onto photoconductor 6 is 0.7 mg/cm$^2$ is read out from FIG. 30. Further, based on the environmental information from environment sensor 209, the transfer material information from operation panel 205, and the counter information from developing device driving counter 210 at that time, transfer efficiency coefficients d1, d2, and d3 for information shown in FIGS. 31 to 33 are read out, for example. Then, effective development potential $\Delta$Ve$_{(255)}$ required for each color is calculated according to the following expression.

$$\Delta Ve_{(255)} = (0.7 + R_{0.7} \times d1 \times d2 \times d3)/\eta(i) \quad (17)$$

At step S8, grid potential Vg and development bias potential Vb which are image forming parameters are determined. More specifically, the approximate expression of the photoconductor sensitivity characteristic at each development position obtained at step S163 shown in FIG. 16 is first counted back to calculate development bias potential Vb for each color for satisfying effective development potential $\Delta$Ve required for each color obtained by the above described processing. At this time, the fog potential correction coefficient calculated by the above processing of calculating development efficiency is also taken into consideration.

A set fog margin is added to the calculated development bias potential Vb to obtain surface potential Vbi for each color. Grid potential Vg to obtain this Vbi is calculated using the charging efficiency obtained at step S181. If either Vg or Vbi exceeds a set grid potential range or a set development bias potential range, a value which is the closest to the set range is set for one, and the other is calculated according to the value (Vb+fog margin or Vbi−fog margin).

At step S9, a potential for correction during multi-copying operation is calculated. More specifically, a potential for correcting sensitivity change during the multi-copying operation is calculated. If the charging efficiency does not substantially change during the multi-copying operation, change in a latent image forming system is conceivably due to the sensitivity change of photoconductor 6. Since the quantity of LD power light is determined by the sensitivity of the photoconductor, the sensitivity change can be corrected by being standardized with exposure and potential. When exposure and potential are standardized geometrically, they may be standardized with the maximum or minimum value. However, since a half tone part having higher sensitivity has a larger impact on an image, exposure and potential are standardized in the vicinity of half decay exposure or at certain gradation. More specifically, the quantity of LD power light is fed back so that the potential at that gradation is always kept constant. Note that actual detection is conducted by V sensor 207. Therefore, if the potential at the position of V sensor 207 is corrected, it is assumed that the potential at the development position is corrected.

More specifically, in this processing, a potential V1 during irradiation with exposure E1 is calculated according to the following expression.

$$V1 = (Vbi - Vr) \times (e^{(-B r^* E1^* D/K_{av})} + e^{(-A r^* E1^* D/K_{av})})/2 + Vr \quad (18)$$

This potential is one during irradiation with exposure E1 when a $\gamma$ correction curve is formed.

Figure 34:
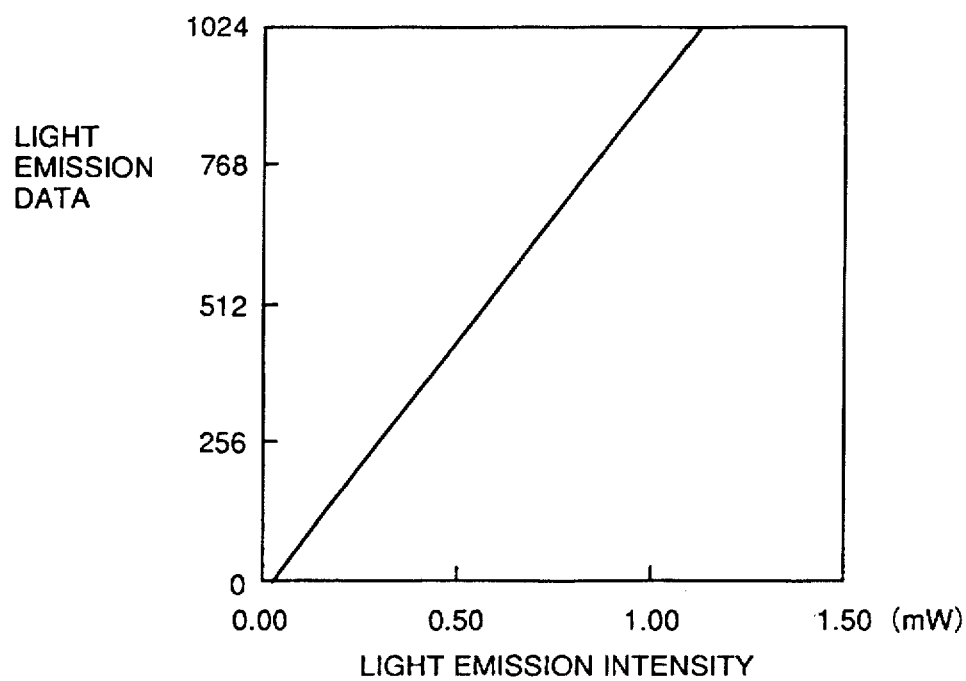
FIG. 34 is a graph of the relationship between light emission data and light emission intensity.

Then, at step S10, the $\gamma$ characteristic during linear emission is predicted. First, the quantity of light from the quantity of bias light to the set quantity of LD power light is divided into 255. Here, such a relationship between light emission and light emission intensity as shown in FIG. 34 is obtained, for example.

Figure 35:
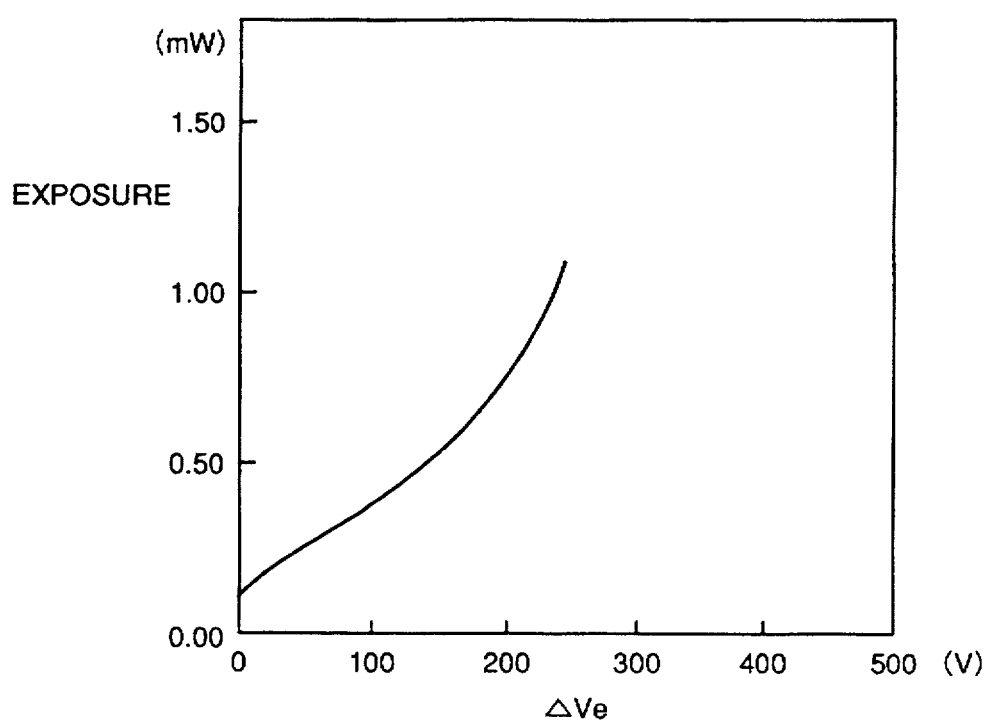
FIG. 35 is a graph of the relationship between exposure and effective development potential.

Then, effective development potential $\Delta$Ve for each of the respective quantities of light, that is, the above described 256 gradations, is calculated using the approximate expression of the photoconductor sensitivity characteristic at each development position obtained at step S4, and set grid potential Vg, development bias potential Vb, and the fog potential correction coefficient. The relationship here between exposure and effective development potentials $\Delta$Ve is as shown in FIG. 35, for example.

Figure 36:
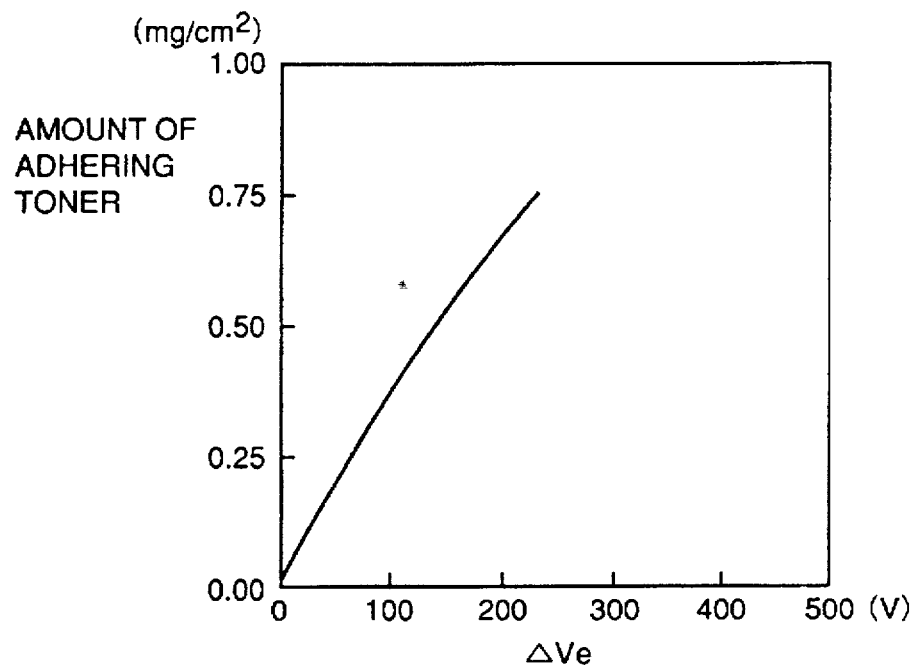
FIG. 36 is a graph of the relationship between the amount of toner adhering onto the photoconductor and the effective development potential.

Then, the amounts of adhering toner on the photoconductor are calculated for respective effective development potentials $\Delta$Ve using the development efficiency. The relationship here between effective development potentials $\Delta$Ve and the amounts of adhering toner on the photoconductor is as shown in FIG. 36, for example.

Then, the amount of toner adhering to a sheet is calculated by subtracting a predicted amount of residual toner without being transferred from the respective amounts of toner adhering to the photoconductor. This predicted amount of residual toner is prestored in a look-up table, and fed back by information of environment sensor 209. When the amount of toner adhering to a sheet is PT (n, i) and the amount of toner adhering to the photoconductor is PA (n, i), the amount of toner adhering to a sheet is given by the following expression.

$$PT(n, i) = PA(n, i) - R(n) \times d1 \times d2 \times d3 \quad (19)$$

Figure 37:
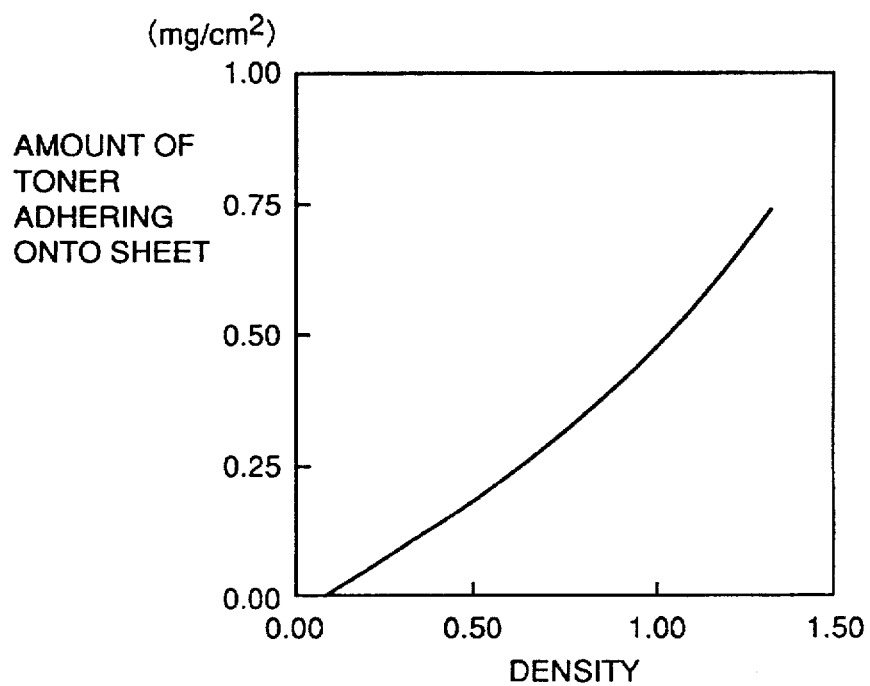
FIG. 37 is a graph of the relationship between the amount of toner adhering onto the sheet and the density.
Figure 38:
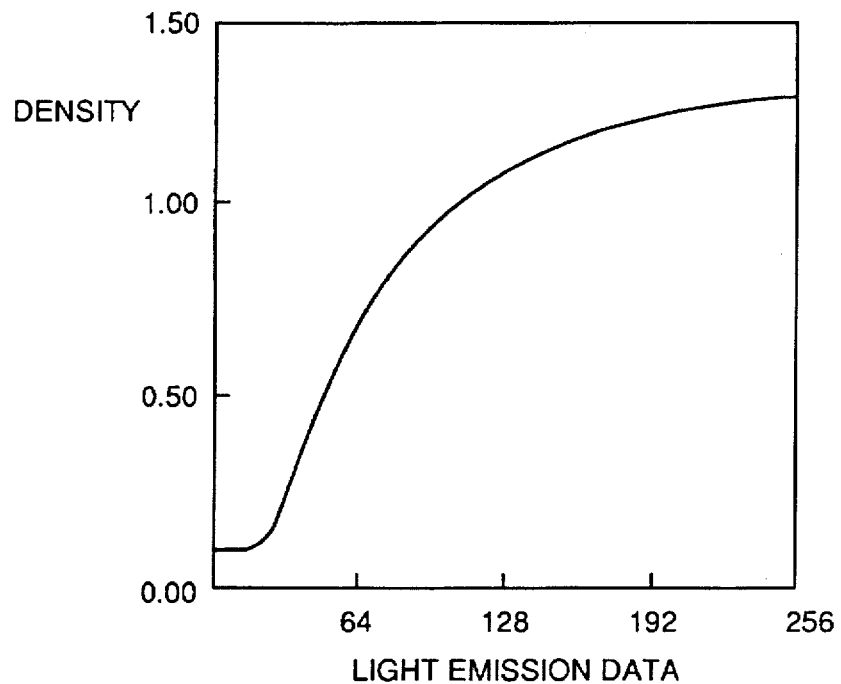
FIG. 38 is a graph showing a γ correction characteristic curve.

Then, the relationship between the amount of toner adhering to a sheet and density is found according to the toner characteristic. This processing is carried out by prestoring the measured characteristic in a look-up table. For example, the relationship between the amount of toner adhering to a sheet and density shown in FIG. 37 is prestored. Therefore, by finding the density on a sheet using this look-up table, densities for 256 gradations can be calculated. As a result, such a $\gamma$ characteristic curve as shown in FIG. 38 can be obtained, for example.

At step S11, light emission characteristic data for $\gamma$ correction is prepared using the $\gamma$ characteristic curve obtained by the above described processings. The light emission characteristic data for $\gamma$ correction can be calculated by X-Y axis conversion of the $\gamma$ characteristic curve, when it is intended to make the $\gamma$ characteristic curve linear.

Figure 39:
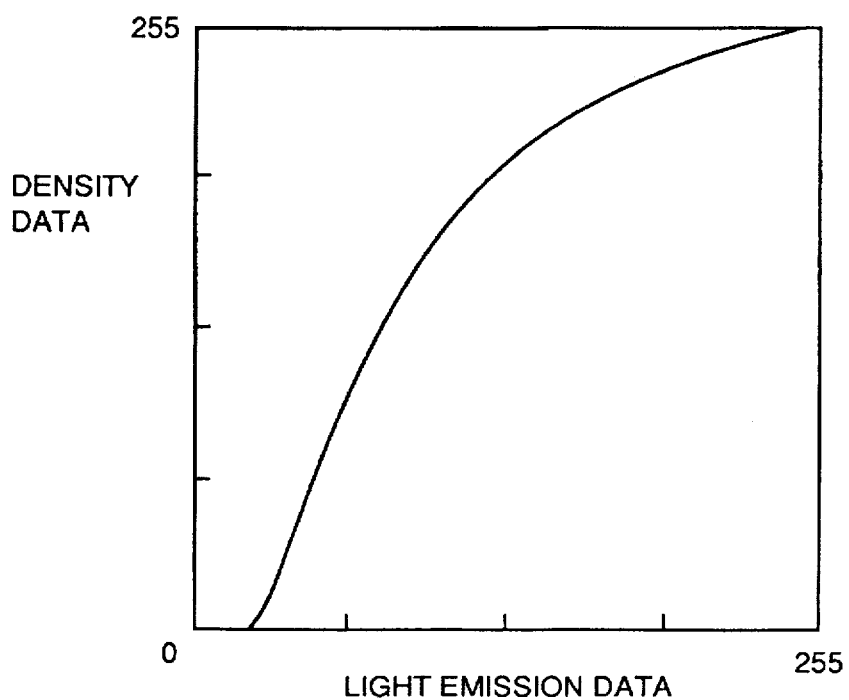
FIG. 39 is a graph of the relationship between density data and light emission data.

The $\gamma$ characteristic curve obtained at step S10 is 8-bit standardized between a target density (density of a target amount of adhering toner) and level 0. When the maximum density of the $\gamma$ characteristic curve does not attain the target density, gain of standardization is adjusted according to the deficiency. As a result, the relationship between density data and light emission data shown in FIG. 39 is obtained, for example.

Figure 40:
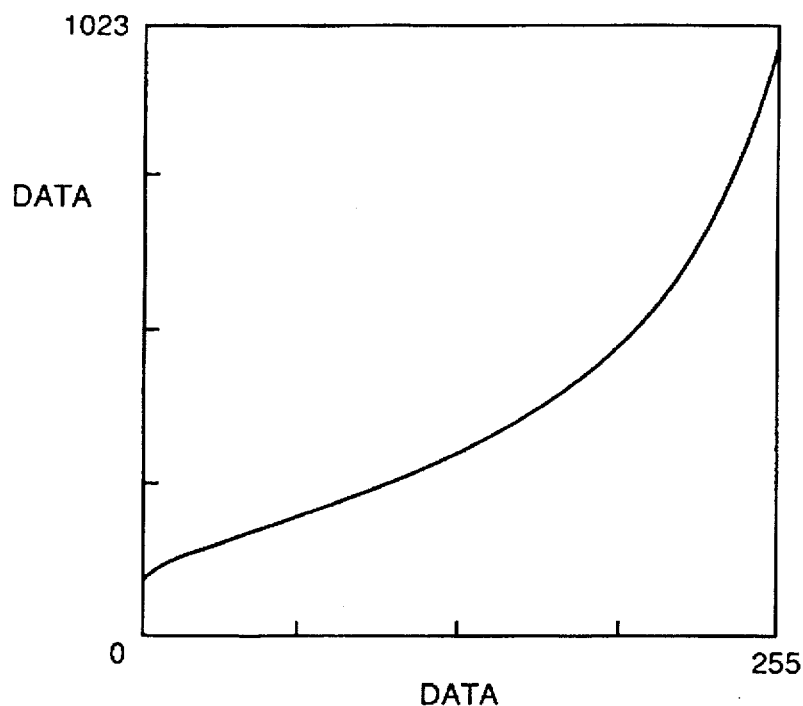
FIG. 40 is a graph of data represented in an X-Y axis converted manner.

Then, 8-bit data is converted into 10-bit data (four times) and the X-Y axis conversion is carried out. After that, the data deficiency is linearly made up. As a result, data shown in FIG. 40 is obtained.

Finally, data obtained with a moving average filter is smoothed. As a result, the light emission characteristic data for $\gamma$ correction is prepared for converting linearly the $\gamma$ characteristic curve prepared at step S10.

Figure 41:
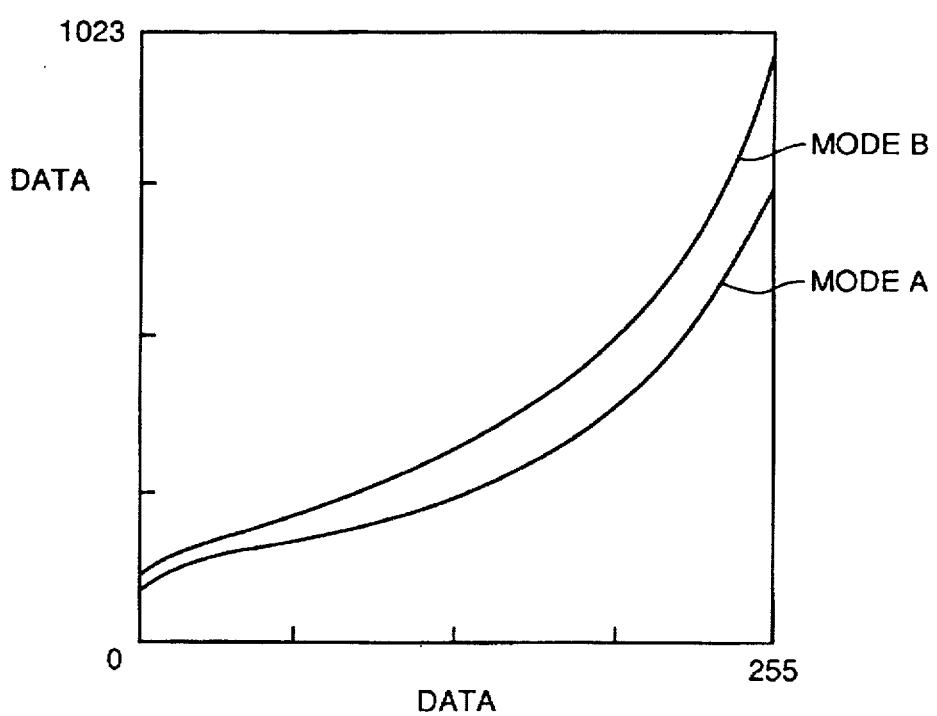
FIG. 41 is a graph of data for two modes represented in the X-Y axis converted manner.

Further, in the present embodiment, a plurality of light emission characteristic data for $\gamma$ correction can be prepared. When a plurality of gradation reproduction methods different in light emission ratio are used, for example, light emission characteristic data for $\gamma$ correction must be prepared so that a predetermined gradation characteristic can be obtained with any of the gradation reproduction methods. Therefore, in the present embodiment, two kinds of light emission characteristic data for $\gamma$ correction as shown in FIG. 41 can be prepared for gradation reproduction methods having a light emission ratio of 100% (mode A) and a light emission ratio of 100% or less (mode B).

First to third methods for preparing a plurality (two kinds) of light emission characteristic data for $\gamma$ correction will be described hereinafter with reference to FIGS. 42 to 44.

Figure 42:
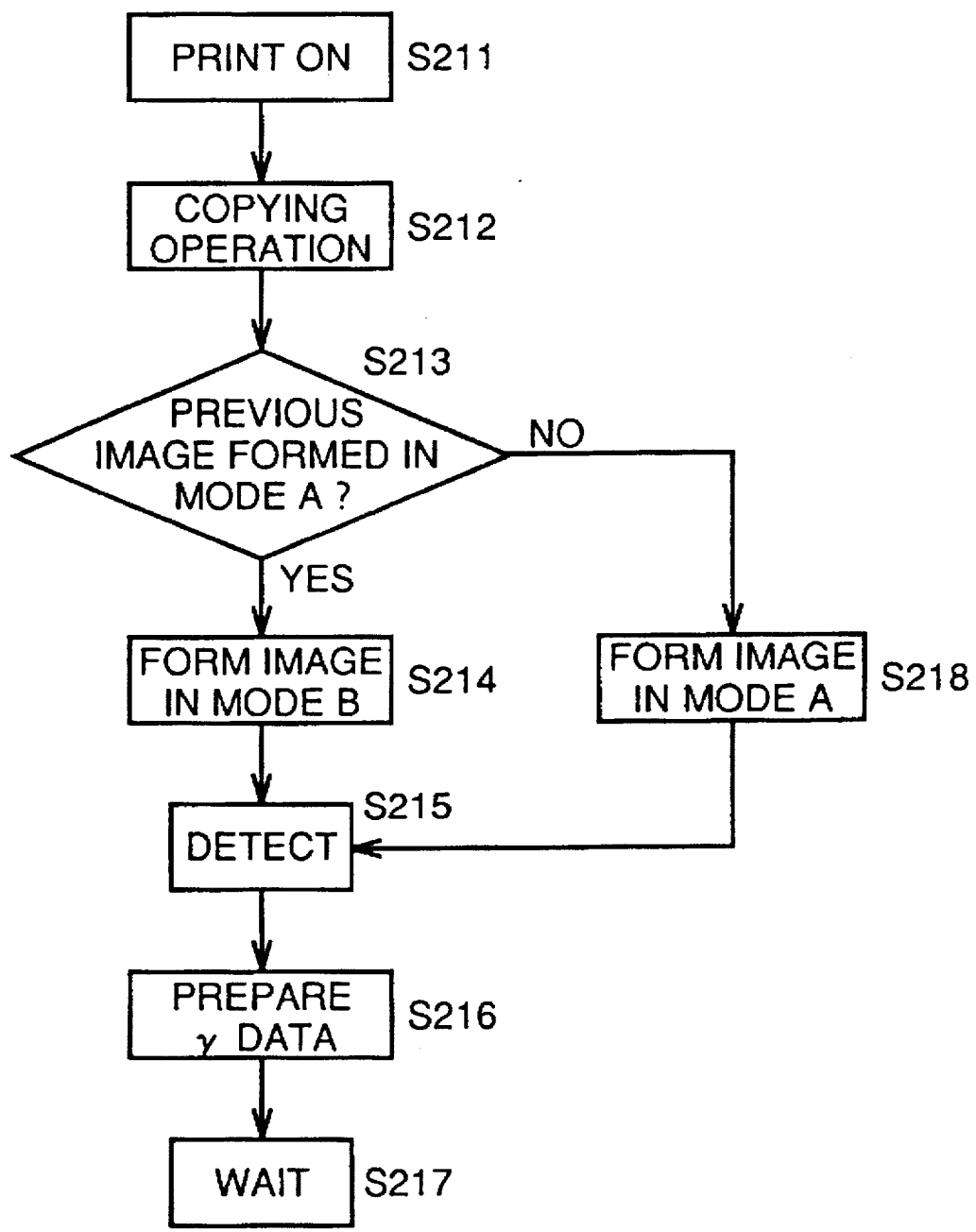
FIG. 42 is a flow chart for describing a first method for preparing a plurality of light emission characteristic data for γ correction.

Referring to FIG. 42, in response to turning on of a print key at step S211, the copying operation is carried out at step S212. Then, it is determined whether or not the previous detection mode is mode A at step S213. If YES at step S213, the procedure goes to step S214 to form an image in mode B. On the other hand, if NO at step S213, the procedure goes to step S218 to form an image in mode A.

Then, each data is detected, similarly at steps S2 and S3. Based on the detected data, light emission characteristic data for $\gamma$ correction is prepared at step S216. Then, wait processing is carried out at step S217.

Figure 43:
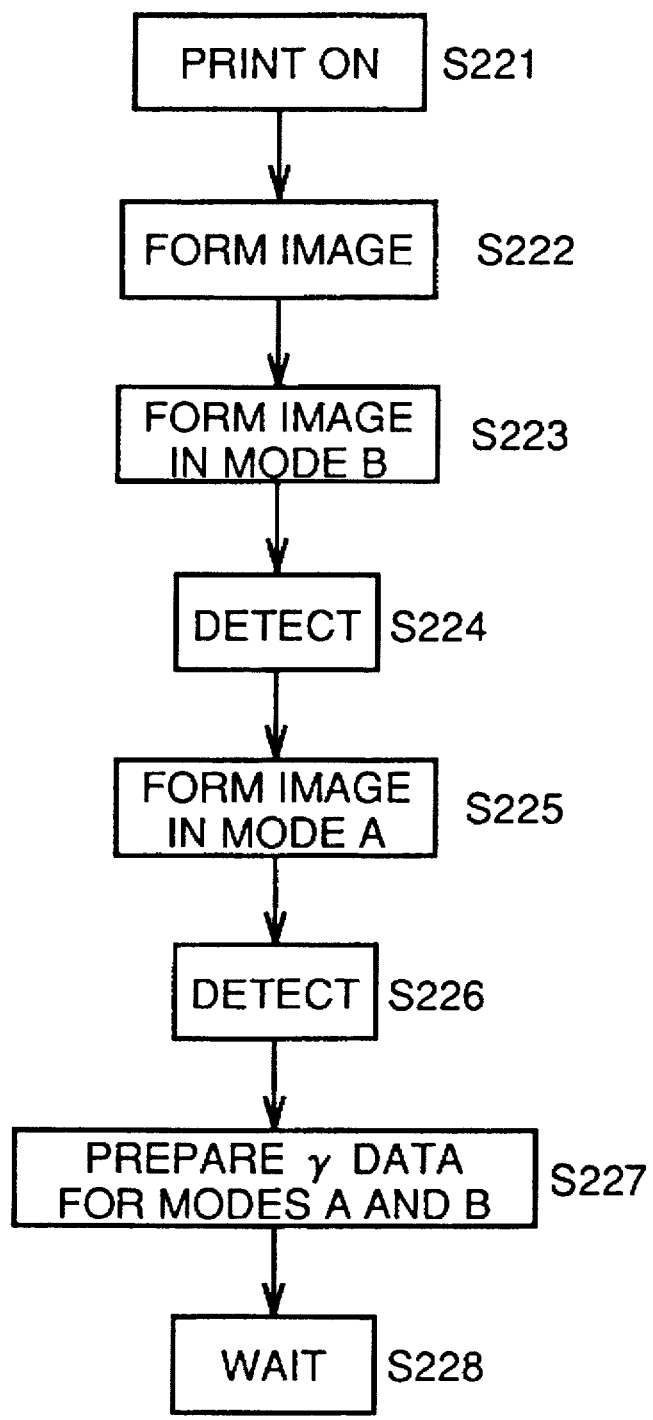
FIG. 43 is a flow chart for describing a second method for preparing a plurality of light emission characteristic data for γ correction.

Referring to FIG. 43, at step S221, a print key is turned on. At step S222, an image is formed. Then, at step S223, an image is formed in mode B. At step S224, each data is detected. At step S225, an image is formed in mode A. At step S226, each data is detected. Then, at step S227, light emission characteristic data for $\gamma$ correction for modes A and B are prepared respectively. Finally, the wait processing is carried out at step S228.

Figure 44:
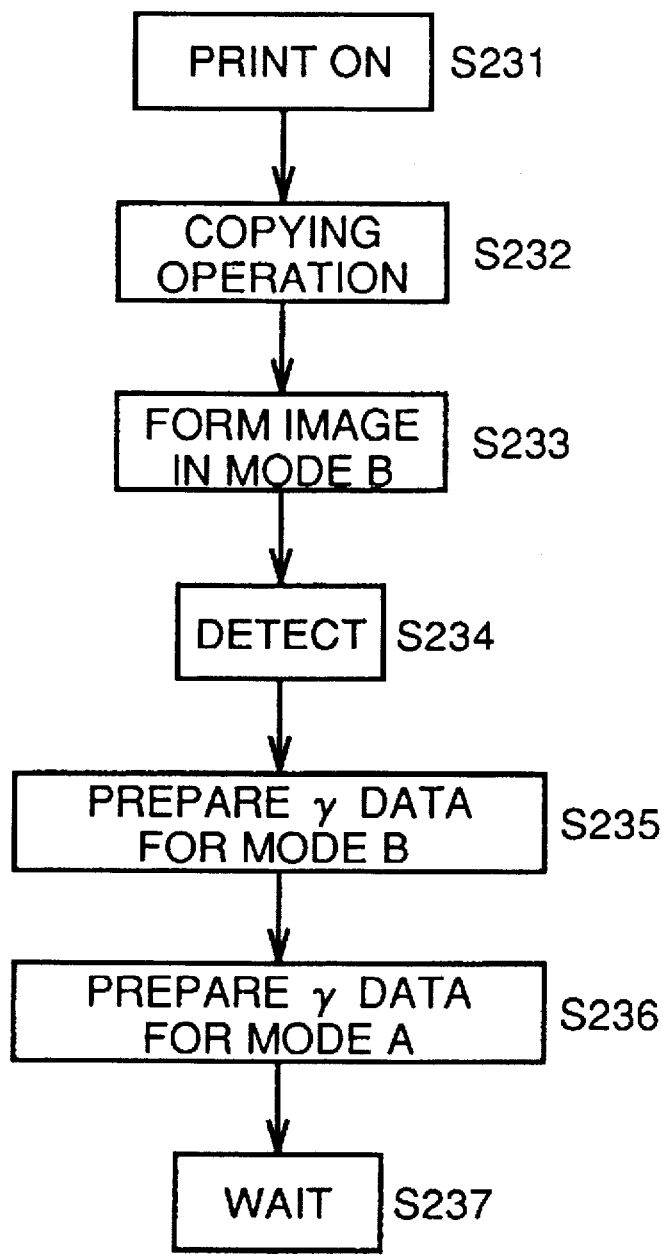
FIG. 44 is a flow chart for describing a third method for preparing a plurality of light emission characteristic data for γ correction.

Referring to FIG. 44, at step S231, a print key is turned on. Then, at step S232, the copying operation is carried out. At step S233, an image is formed in mode D. At step S234, each data is detected. At step S235, light emission characteristic data for $\gamma$ correction for mode B is prepared. Then, at step S236, light emission characteristic data for $\gamma$ correction for mode A is prepared using that for mode B prepared at step S235. Finally, the wait processing is carried out at step S237.

With each of the above described methods, light emission characteristic data for $\gamma$ correction suitable for the respective modes A and B, that is, the respective light emission ratios, can be prepared, and a desired gradation characteristic according to each gradation reproduction method can be obtained. In the first method, the detection processing (step S215) is simplified, since only one detection is carried out. In the second method, since the light emission characteristic data for $\gamma$ correction for the respective modes are prepared, the data can be prepared more accurately. Further, in the third method, since light emission characteristic data for $\gamma$ correction prepared for one mode is used for preparation of that for the other mode, the processing is simplified.

Alternatively, a desired gradation characteristic can be obtained by switching a plurality of light emission characteristic data for $\gamma$ correction by $\gamma$ correcting unit 219 in response to a pixel signal from image signal processing unit 4. In this case, since the plurality of light emission characteristic data for $\gamma$ correction are already operated and stored, the data can be switched at a high speed even during making one copy, for example.

Referring again to FIG. 3, a print key is input at step S12. Then, it is determined whether or not a print switch is turned on at step S13. If YES at step S13, the procedure goes to step S14. If NO at step S13, the procedure repeats step S12.

At step S14, image formation processing for each color is carried out. At step S15, it is confirmed whether or not the copying operation is completed. If NO at step S15, the procedure goes back to step S14. If YES at step S15, the procedure goes back to step S2, and repeats the steps thereafter.

Steps S13 to S15 will be described more specifically with reference to FIG. 45.

Figure 45:
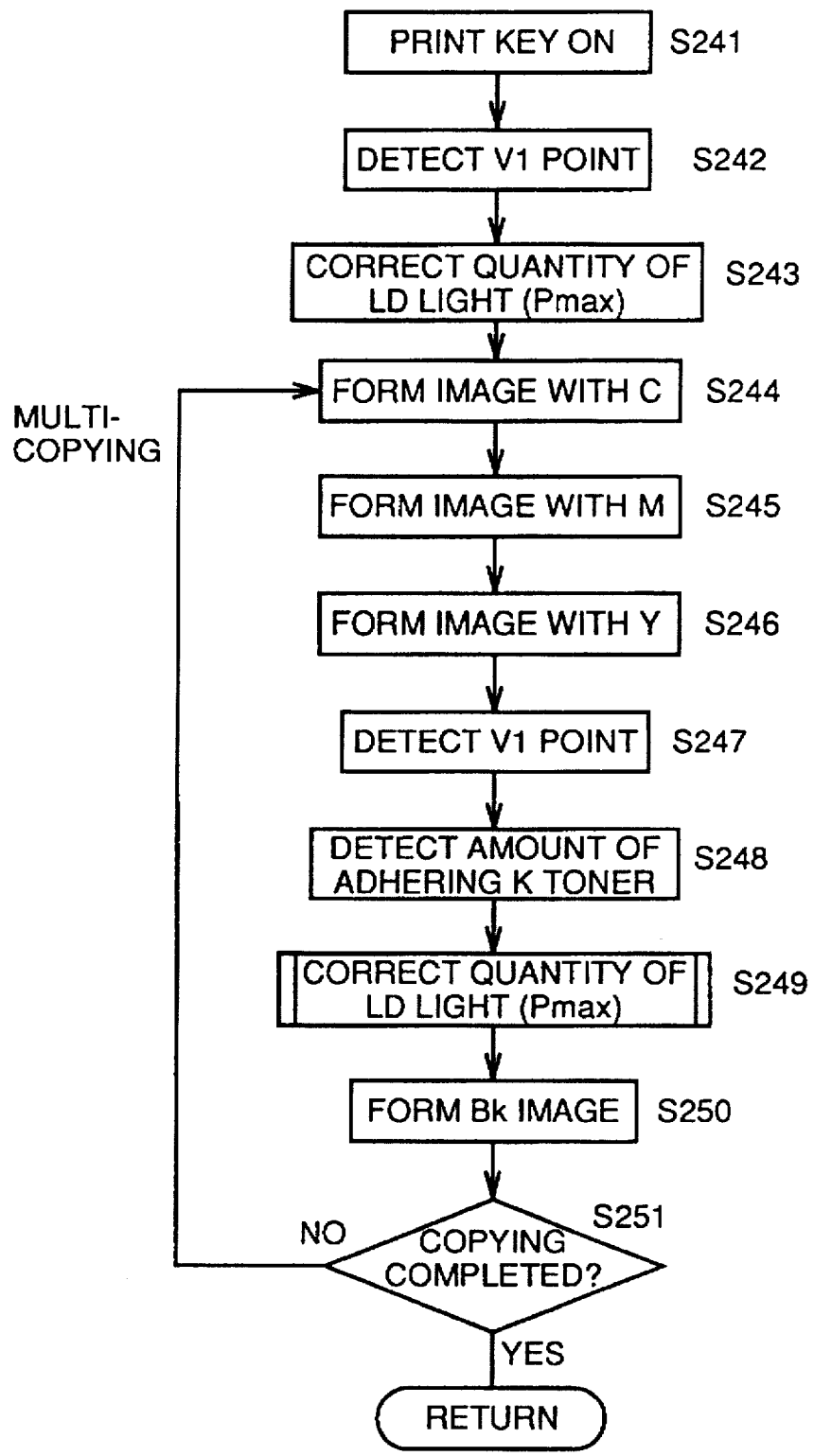
FIG. 45 is a flow chart for specifically describing processing at steps S13 and S14 shown in FIG. 3.

Referring to FIG. 45, when a print key is turned on at step S241, V1 point is detected at step S242. Then, at step S243, the quantity of LD power light (Pmax) is corrected.

At step S244, an image is formed with C toner. At step S245, an image is formed with M toner. At step S246, an image is formed with Y toner. At step S247, V1 point is detected. At step S248, the amount of adhering K toner is detected. At step S249, the quantity of LD power light (Pmax) is corrected.

Figure 46:
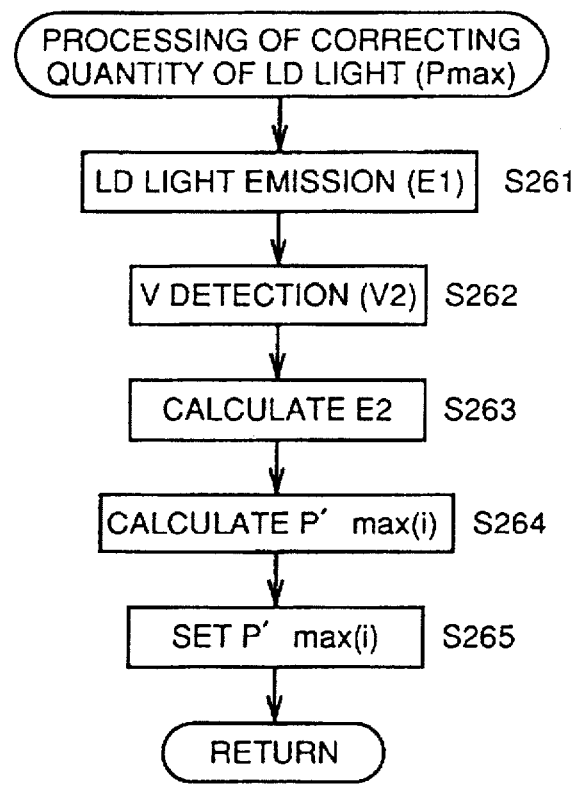
FIG. 46 is a flow chart for describing processing of correcting the quantity of LD light.
Figure 47:
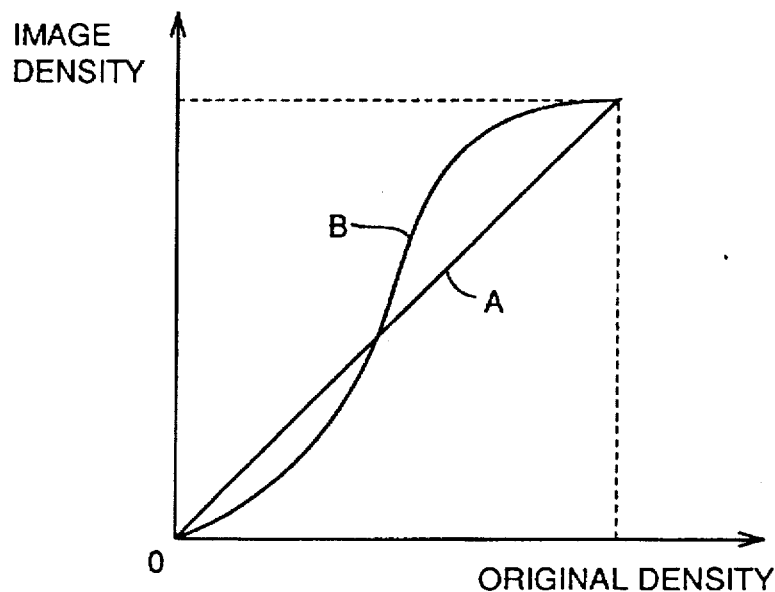
FIG. 47 is a schematic view showing the γ characteristic.

Referring to FIG. 46, at step S261, LD light emission processing is carried out. At step S262, the V detection processing is carried out. Then, at step S263, half decay exposure E2 in an actual image is calculated. At step S264, P'max(i) is calculated. At step S265, the calculated P'max(i) is set.

The quantity of LD power light is corrected as follows. Potential V2 at E1 exposure obtained at step S9 is actually measured, and based on the value, half decay exposure E2 in an actual image is calculated according to the following expression.

$$E2=(E1)^{-2}\{Ks \times \ln\{(V1-Vr)/(V2-Vr)\}+E1\} \quad (20)$$

As a result, P'max(i) during the multi-copying operation is given by the following expression.

$$P'max(i)=Pmax(i) \times (E2/E1) \quad (21)$$

According to the above expression, V is detected for final color VG, and Pmax(i) is changed to P'max(i) during the next copying operation. As a result, the potential during the continuous copying operation can be detected, and based on the result, an image forming parameter can be changed so that an optimal image is obtained.

Referring again to FIG. 45, at step S250, an image is formed with K toner. Then, at step S251, it is determined whether or not the copying operation is completed. If NO at step S251, the procedure goes to step S244 to continue the multi-copying processing. IF YES at step S251, the procedure goes to step S2 shown in FIG. 3 to continue the processing thereafter.

By the above described processing, an optimal image forming parameter and light emission characteristic data for γ correction can always be calculated, and a favorable image can be formed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus for converting image data into light emission data, indicating the quantity of emission light based on γ correction data, to form an image based on the light emission data, said image forming apparatus comprising:

image forming means for forming an image, said image forming means including:
    a photoconductor,
    charging means for charging said photoconductor,
    exposing means for exposing said photoconductor, charged by said charging means, to light modulated by the light emission data to form an electrostatic latent image on said photoconductor, and
    developing means for developing, with a developer material, the electrostatic latent image on said photoconductor formed by said exposing means;

developer material detecting means for detecting the amount of the developer material adhering to the image on said photoconductor developed by said developing means;

first specifying means for specifying a sensitivity characteristic of said photoconductor;

second specifying means for specifying a development characteristic of said developing means based on the sensitivity characteristic specified by said first specifying means and the amount of adhering developer material detected by said developer material detecting means;

deciding means for deciding an optimal operating condition of said image forming means based on the development characteristic of said developing means specified by said second specifying means; and calculating means for calculating γ correction data for obtaining a desired gradation characteristic under the operating condition decided by said deciding means.

2. The image forming apparatus according to claim 1, wherein:

said first specifying means includes potential detecting means for detecting a surface potential of said photoconductor, and specifies the sensitivity characteristic of said photoconductor by controlling said exposing means to expose said photoconductor, charged by said charging means, to a plurality of different quantities of light and by controlling said potential detecting means to detect the surface potential of the exposed photoconductor and approximating a relationship between the surface potential of the exposed photoconductor and the quantity of exposure by a function based on the detection result obtained by said potential detecting means.

3. The image forming apparatus according to claim 2, wherein:

said second specifying means specifies the development characteristic of the developing means by controlling said image forming means to prepare a plurality of test images different in density, by controlling said developer material detecting means to detect the amount of developer material adhering to the respective test image, and by calculating a potential of the respective test image by the sensitivity characteristic specified by said first specifying means, to approximate a relationship between a development potential, which is the difference between the surface potential of said photoconductor and a development bias potential, and the amount of adhering developer material by development based on the detected amount of the developer material adhering to the respective test image and the calculated potential of the respective test image.

4. The image forming apparatus according to claim 3, wherein:

said deciding means calculates the development potential, at which a predetermined target amount of adhering developer material is obtained based on the specified development characteristic, and calculates a charge potential and a development bias potential at which the calculated development potential is obtained based on the specified sensitivity characteristic of said photoconductor, to decide the calculated charge potential and development bias potential as an operating condition of said image forming means.

5. The image forming apparatus according to claim 1, further comprising:

determining means for comparing the sensitivity characteristic specified by said first specifying means with a predetermined characteristic to determine whether the specified sensitivity characteristic is regular or irregular based on the comparison result.

6. The image forming apparatus according to claim 5, further comprising:

means for, when said determining means determines that the specified sensitivity characteristic is irregular, employing said predetermined characteristic instead of the specified sensitivity characteristic.

7. The image forming apparatus according to claim 5, wherein:

said first specifying means specifies the sensitivity characteristic in a predetermined period, and said determining means determines that the specified sensitivity characteristic is irregular by comparing the specified sensitivity characteristic with one specified in the previous period.

8. The image forming apparatus according to claim 5, further comprising:

warning means for warning the user of irregularity when said determining means determines that the specified sensitivity characteristic is irregular.

9. The image forming apparatus according to claim 1, further comprising:
determining means for comparing the development characteristic specified by said second specifying means with a predetermined characteristic to determine whether the specified development characteristic is regular or irregular based on the comparison result.

10. The image forming apparatus according to claim 9, further comprising:
means for, when said determining means determines that the specified development characteristic is irregular, employing said predetermined characteristic instead of the specified development characteristic.

11. The image forming apparatus according to claim 9, wherein:
said second specifying means specifies the development characteristic in a predetermined period, and
said determining means determines that the specified development characteristic is irregular by comparing the specified development characteristic with one specified in the previous period.

12. The image forming apparatus according to claim 9, further comprising:
warning means for warning the user of irregularity when said determining means determines that the specified development characteristic is irregular.

13. The image forming apparatus according to claim 1, further comprising:
reset means for resetting to an initial value at least one of the sensitivity characteristic specified by said first specifying means and the development characteristic specified by said second specifying means.

14. The image forming apparatus according to claim 13, wherein:
said reset means is started up in response to a manual keying operation.

15. The image forming apparatus according to claim 13, wherein:
said reset means is started up in response to an exchange of parts of the image forming apparatus.

16. The image forming apparatus according to claim 15, wherein:
said reset means includes means for detecting an exchange of another photoconductor for said photoconductor.

17. The image forming apparatus according to claim 15, wherein:
said reset means includes means for detecting an exchange of another developing means for said developing means.

18. The image forming apparatus according to claim 15, wherein:
said reset means includes means for detecting an exchange of another developer material detecting means for said developer material detecting means.

19. The image forming apparatus according to claim 1, wherein:
said exposing means is modulated in first and second modes different in emission ratio, and
said calculating means calculates respective γ correction data for said first and second modes.

20. An image forming apparatus for forming an image under a set image forming condition, said image forming apparatus comprising:

image forming means for forming an image, said image forming means including:
a mobile photoconductor,
charging means for charging said photoconductor,
exposing means for exposing said photoconductor, charged by said charging means, to light modulated by light emission data to form an electrostatic latent image on said photoconductor, and
developing means for developing, with a developer material, the electrostatic latent image on said photoconductor formed by said exposing means;
potential detecting means for detecting a potential of said photoconductor at a predetermined detection position;
first specifying means for specifying a sensitivity characteristic of said photoconductor at said detection position based on the potential of said photoconductor detected by said potential detecting means;
second specifying means for specifying the sensitivity characteristic of said photoconductor at a development position of said developing means based on the sensitivity characteristic of said photoconductor specified by said first specifying means; and
setting means for determining and setting an image forming condition based on the sensitivity characteristic specified by said second specifying means.

21. The image forming apparatus according to claim 20, wherein:
said image forming condition includes a charge potential of said charging means and a development bias potential of said developing means.

22. The image forming apparatus according to claim 20, wherein:
said first specifying means specifies the sensitivity characteristic of said photoconductor by controlling said exposing means to expose said photoconductor, charged by said charging means, to a plurality of different quantities of light and by controlling said potential detecting means to detect a surface potential of the exposed photoconductor to approximate a relationship between the surface potential of the exposed photoconductor and the quantity of exposure by a function based on the detection result obtained by said potential detecting means.

23. The image forming apparatus according to claim 22, wherein:
said second specifying means specifies the sensitivity characteristic at the development position by a function obtained by correcting a coefficient of the function, based on the detection result obtained by said potential detecting means, according to the development position.

24. The image forming apparatus according to claim 23, wherein:
said second specifying means includes means for detecting a using condition of the image forming apparatus, and corrects the sensitivity characteristic at the development position according to the detected using condition.

25. The image forming apparatus according to claim 24, wherein:
said using condition includes an ambient temperature.

26. The image forming apparatus according to claim 20, wherein:
said photoconductor is mobile in a plurality of modes different in moving speed, and said second specifying means specifies the sensitivity characteristic at the development position according to the moving speed of said photoconductor.

27. An image forming apparatus for forming an image under a set image forming condition, said image forming apparatus comprising:

image forming means for forming an image, said image forming means including:
a photoconductor,
charging means for charging said photoconductor,
exposing means for exposing said photoconductor, charged by said charging means, to light modulated by light emission data to form an electrostatic latent image on said photoconductor, and
developing means for developing, with a developer material, the electrostatic latent image on said photoconductor formed by said exposing means;

developer material detecting means for detecting the amount of developer material adhering to the image on said photoconductor developed by said developing means;

specifying means for specifying a sensitivity characteristic of said photoconductor;

deciding means for controlling said image forming means to form a test image, for controlling said developer material detecting means to detect the amount of developer material adhering to the test image, and for calculating a surface potential of the test image based on the sensitivity characteristic specified by said specifying means to decide the surface potential of said photoconductor at which development by said developing means is started based on the detected adhering amount and the calculated surface potential; and setting means for setting an image forming condition based on the surface potential decided by said deciding means.

28. The image forming apparatus according to claim 27, wherein:

said set image forming condition includes a charge potential of said charging means and a development bias potential of said developing means.

29. The image forming apparatus according to claim 27, wherein:

said specifying means includes potential detecting means for detecting the surface potential of said photoconductor, and specifies the sensitivity characteristic of said photoconductor by controlling said exposing means to expose said photoconductor, charged by said charging means, to a plurality of different quantities of light and by controlling said potential detecting means to detect the surface potential of the exposed photoconductor to approximate a relationship between the surface potential of the exposed photoconductor and the quantity of exposure by a function based on the detection result obtained by said potential detecting means.

30. The image forming apparatus according to claim 28, further comprising:

adjusting means for adjusting the surface potential of said photoconductor at which said development is started manually.

31. An image forming apparatus for converting image data into light emission data, indicating the quantity of light emission based on γ correction data, to form an image based on the light emission data, said image forming apparatus comprising:

image forming means for forming an image, said image forming means including:
a photoconductor,
charging means for charging said photoconductor,
exposing means for exposing said photoconductor, charged by said charging means, to light modulated by the light emission data to form an electrostatic latent image on said photoconductor,
developing means for developing, with a developer material, the electrostatic latent image on said photoconductor formed by said exposing means, and
transferring means for transferring the image developed by said developing means onto a transfer material;

developer material detecting means for detecting the amount of developer material adhering to the image on said photoconductor developed by said developing means;

first specifying means for specifying a sensitivity characteristic of said photoconductor;

second specifying means for specifying a development characteristic of said developing means based on the sensitivity characteristic specified by said first specifying means and the adhering amount of developer material detected by said developer material detecting means;

third specifying means for specifying a transfer characteristic of said transferring means;

deciding means for deciding an optimal operating condition of said image forming means based on the development characteristic of said developing means specified by said second specifying means and the transfer characteristic specified by said third specifying means; and calculating means for calculating γ correction data for obtaining a desired gradation characteristic under the operating condition decided by said deciding means.

32. The image forming apparatus according to claim 31, wherein:

said first specifying means includes potential detecting means for detecting a surface potential of said photoconductor, and specifies the sensitivity characteristic of said photoconductor by controlling said exposing means to expose said photoconductor, charged by said charging means, to a plurality of different quantities of light and by controlling said potential detecting means to detect the surface potential of the exposed photoconductor to approximate a relationship between the surface potential of the exposed photoconductor and the amount of exposure by a function based on the detection result obtained by said potential detecting means.

33. The image forming apparatus according to claim 32, wherein:

said second specifying means specifies the development characteristic of the developing means by controlling said image forming means to form a plurality of test images different in density, by controlling said developer material detecting means to detect the amount of developer material adhering to the respective test image, and by calculating a potential of the respective test image by the sensitivity characteristic specified by said first specifying means to approximate a relationship between a development potential, which is the difference between the potential of said photoconductor and a development bias potential, and the amount of developer material adhering by development by a function based on the amount of developer material adhering to the respective test image and the calculated potential of the respective test image.

34. The image forming apparatus according to claim 33, wherein:

said deciding means calculates, based on the specified transfer characteristic, the amount of adhering developer material on said photoconductor with which a predetermined target density is obtained on a transfer material, calculates a development potential at which the calculated amount of adhering developer material is obtained, and calculates a charge potential and the development bias potential at which the calculated development potential is obtained based on the specified sensitivity characteristic of said photoconductor, to decide the calculated charge potential and the development bias potential as an operating condition of said image forming means.

35. The image forming apparatus according to claim 31, wherein:

said third specifying means has a memory storing a transfer efficiency.

36. The image forming apparatus according to claim 35, wherein:

said memory further stores correction data for correcting the transfer efficiency according to a using condition.

37. The image forming apparatus according to claim 36, wherein:

said correction data includes data on an ambient temperature.

38. The image forming apparatus according to claim 36, wherein:

said correction data includes data on the kind of transfer materials.

39. The image forming apparatus according to claim 36, wherein:

said correction data includes data on the number of copies to be made by the apparatus.

* * * * *